United States Patent
de Callafon et al.

(10) Patent No.: US 11,128,137 B2
(45) Date of Patent: Sep. 21, 2021

(54) BATTERY ENERGY STORAGE SYSTEM AND MICROGRID CONTROLLER

(71) Applicant: The Regents of the University of California, Oakland, CA (US)

(72) Inventors: Raymond de Callafon, West Hollywood, CA (US); Amir Valibeygi, West Hollywood, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 16/720,558

(22) Filed: Dec. 19, 2019

(65) Prior Publication Data

US 2020/0195011 A1    Jun. 18, 2020

Related U.S. Application Data

(60) Provisional application No. 62/781,522, filed on Dec. 18, 2018.

(51) Int. Cl.
*H02J 3/32* (2006.01)
*H02J 3/38* (2006.01)
*H02J 13/00* (2006.01)

(52) U.S. Cl.
CPC ............... *H02J 3/32* (2013.01); *H02J 3/381* (2013.01); *H02J 13/00002* (2020.01); *H02J 2203/20* (2020.01); *H02J 2300/24* (2020.01)

(58) Field of Classification Search
CPC ........ H02J 3/32; H02J 3/381; H02J 13/00002; H02J 2203/20; H02J 2300/24
See application file for complete search history.

(56) References Cited

U.S. PATENT DOCUMENTS

| | | | |
|---|---|---|---|
| 2016/0322837 A1* | 11/2016 | Choi | H02J 3/32 |
| 2017/0070049 A1* | 3/2017 | Laubenstein | H02J 7/00047 |
| 2017/0085091 A1 | 3/2017 | Kamalasadan et al. | |
| 2017/0126032 A1 | 5/2017 | Beaston | |
| 2017/0170684 A1 | 6/2017 | Matthey | |

OTHER PUBLICATIONS

Valibeygi et al., "Microgrid Control Using Remote Controller Hardware-in-the-Loop Over the Internet", 2018 IEEE Power & Energy Society Innovative Smart Grid Technologies Conference (ISGT), 2018, pp. 1-5, IEEE.

(Continued)

*Primary Examiner* — John W Poos
(74) *Attorney, Agent, or Firm* — Greer, Burns & Crain, Ltd.; Steven P. Fallon

(57) ABSTRACT

This invention is directed to systems and methods that track a specified stored energy level profile for a BESS in a microgrid. The systems and methods including using a control algorithm that tracks the stored energy level profile for the BESS. The controller algorithm includes a Kalman Filter design for a model-based state reconstruction to overcome sensor/communication errors during real-time operation. The latter is important to guarantee the ability of the microgrid to continue its seamless operation during periods of erroneous sensor measurements or flawed communication.

19 Claims, 26 Drawing Sheets

(56) References Cited

OTHER PUBLICATIONS

Shahidehpour et al., "Cutting Campus Energy Costs with Hierarchical Control: The Economical and Reliable Operation of a Microgrid", IEEE Electrification Magazine, 2013, pp. 40-56, vol. 1, No. 1, IEEE.
Olivares et al., "Trends in Microgrid Control", IEEE Transactions on Smart Grid, 2014, pp. 1905-1919, vol. 5, No. 1, IEEE.
Konakalla et al., "Optimal Filtering for Grid Event Detection from Real-time Synchrophasor Data", Procedia Computer Science, 2016, pp. 931-940, vol. 80, Elsevier B.V.
De La Ree et al., "Synchronized Phasor Measurement Applications in Power Systems", IEEE Transactions on Smart Grid, 2010, pp. 20-27, vol. 1, No. 1, IEEE.
De Callafon et al., "Scheduling of Dynamic Electric Loads Using Energy Storage and Short Term Power Forecasting", 2016 IEEE Conference on Control Applications (CCA), 2016, pp. 1531-1536, IEEE.
Ahn et al., "Power Scheduling of Distributed Generators for Economic and Stable Operation of a Microgrid", IEEE Transactions on Smart Grid, 2013, pp. 398-405, vol. 4, No. 1, IEEE.
Zhang et al., "Robust Energy Management for Microgrids With High-Penetration Renewables", IEEE Transactions an Sustainable Energy, 2013, pp. 944-953, vol. 4, No. 4, IEEE.

* cited by examiner

BATTERY ENERGY STORAGE SYSTEM AND MICROGRID CONTROLLER

This application claims the benefit of U.S. Provisional Application No. 62/781,522 filed on Dec. 18, 2018, entitled "BATTERY ENERGY STORAGE SYSTEM AND MICROGRID CONTROLLER", the contents of which are incorporated herein by reference as though set forth in their entirety.

FIELD OF INVENTION

The present disclosure generally relates to the field of Battery Energy Storage Systems ("BESS"). More particularly, the present disclosure generally relates to controlling a stored energy level of a BESS in a microgrid.

BACKGROUND OF THE INVENTION

A microgrid is a localized grouping of electricity generation, energy storage, and loads that normally operates connected to a traditional centralized grid (power distribution grid or macrogrid) via a point of common coupling (PCC). This single point of common coupling with the macrogrid can be disconnected, islanding the microgrid. Microgrids are part of a structure aiming at producing electrical power locally from many distributed energy resources (DERs). In a microgrid, a DER is connected via a converter which controls the output of the DER, i.e. the current injected into the microgrid. DERs may include renewable and/or non-renewable energy resources.

A microgrid (in grid connected mode, i.e. connected to the distribution grid) supplies the optimized or maximum power outputs from the connected DER sites and the rest of the power is supplied by the distribution grid. The microgrid is connected to the distribution grid at a PCC through a controllable switch/breaker. This grid connection is lost when the breaker is open during grid fault and the microgrid is islanded.

A microgrid is controlled by a controller, which may be centralized or distributed, which e.g. controls DERs in accordance with voltage or current control schemes. One of the aspects of microgrid control is efficient control of the grid interface at the PCC. Various conditions e.g. power flow, voltage, disconnection or power factor at the PCC impose different control requirements within the microgrid.

In some environments, power generation systems using renewable resources may be used as DERS and be integrated into a microgrid. Power production from the conversion of energy produced by renewable resource, such as Photovoltaic (PV) and Wind energy systems, may be highly variable and unpredictable. Variability of power production can be mitigated by the use of a battery energy storage system (BESS) to allow temporary storage and dispatch of power in a microgrid. However, a BESS has a limited energy storage capability characterized by the size or capacity of the battery. It is important to keep the stored energy level of the BESS within operation limits to avoid over-charging or under-charging of the BESS. Keeping the stored energy level of the BESS within operating limits can be done by real-time monitoring and control.

Thus, what is needed are systems and methods that track a specified stored energy level profile for a BESS in a microgrid.

SUMMARY

The following presents a simplified overview of the example embodiments in order to provide a basic understanding of some embodiments of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented hereinbelow. It is to be understood that both the following general description and the following detailed description are exemplary and explanatory only and are not restrictive.

This invention is directed to systems and methods that track a specified stored energy level profile for a BESS in a microgrid. The systems and methods including using a control algorithm that tracks the stored energy level profile for the BESS. The controller algorithm includes a Kalman Filter design for a model-based state reconstruction to overcome sensor/communication errors during real-time operation. The latter is important to guarantee the ability of the microgrid to continue its seamless operation during periods of erroneous sensor measurements or flawed communication.

In the present disclosure, attributes of a battery energy storage system (BESS) and the stored energy level of a BESS are characterized. In one embodiment, attributes of a battery energy storage system (BESS) may refer to the capacity of the BESS indicating the total energy that may be stored in the BESS. In another embodiment, an absolute measure for the stored energy level of the BESS is continuously received. In other embodiments, a relative measure of stored energy level of the BESS is continuously received.

In one embodiment, data representing absolute measure for the stored energy level of the BESS may refer to energy in Joules (J), Watt-hour (Wh), Kilowatt-hour (KWh) or Megawatt-hour (MWh) of energy. In another embodiment, data representing relative measure for the stored energy level of the BESS may refer to the State of Charge (SoC) in percentage of the ratio of the absolute measure for the stored energy divided by the total energy that can be stored in the BESS.

A control data stream for the BESS is continuously generated. In one embodiment, the control data stream may refer to the current dispatch commands sent to the BESS. In another embodiment, the control data stream for the BESS may refer to AC real power dispatch commands sent to an inverter integrated with the BESS.

The control data stream for the BESS is continuously generated by a feedback control algorithm that is continuously processing a reference data stream and a feedback data stream. In an embodiment, the reference data stream may be data representing the desired absolute measure for the stored energy level of the BESS. In other variations, the reference data stream may be data representing the desired relative measure for the stored energy level of the BESS.

In one embodiment, the feedback data stream may be measurements representing the absolute measure for the stored energy level of the BESS. In another embodiment, the feedback data stream may be measurements representing relative measure for the stored energy level of the BESS. In yet another embodiment, the feedback data stream may have intermittently incorrect or erroneous measurements representing the absolute or relative measure for the stored energy level of the BESS.

In one embodiment, the feedback control algorithm is the combination of switching logic and dynamic filters that ensures that the absolute or relative measure for the stored energy level of the BESS is stabilized and kept constant. In another embodiment, the feedback control algorithm is the combination of switching logic and dynamic filters that ensures that the absolute or relative measure of the stored energy level of the BESS is tracking or following the reference data stream representing the desired absolute or relative measure of the stored energy level of the BESS.

The present disclosure provides an innovative solution to control the absolute or relative measure of the stored energy level of the BESS by controlling the power flow of a BESS. The subject matter described herein provides many technical advantages by combining three key inventions: (a) the use of real-time feedback measurement of the absolute or relative measure of the stored energy level of the BESS, (b) the continuous generation of power demand or current demand signals for the BESS, and (c) the ability to handle intermittently incorrect or erroneous measurements representing the absolute or relative measure for the stored energy level of the BESS.

Still other advantages, embodiments, and features of the subject disclosure will become readily apparent to those of ordinary skill in the art from the following description wherein there is shown and described a preferred embodiment of the present disclosure, simply by way of illustration of one of the best modes best suited to carry out the subject disclosure As it will be realized, the present disclosure is capable of other different embodiments and its several details are capable of modifications in various obvious embodiments, all without departing from, or limiting, the scope herein. Accordingly, the drawings and descriptions will be regarded as illustrative in nature and not as restrictive.

BRIEF DESCRIPTION OF THE DRAWINGS

The drawings are of illustrative embodiments. They do not illustrate all embodiments. Other embodiments may be used in addition or instead. Details which may be apparent or unnecessary may be omitted to save space or for more effective illustration. Some embodiments may be practiced with additional components or steps and/or without all of the components or steps which are illustrated. When the same numeral appears in different drawings, it refers to the same or like components or steps.

DETAILED DESCRIPTION OF THE ILLUSTRATIVE EMBODIMENTS

Figure 1:
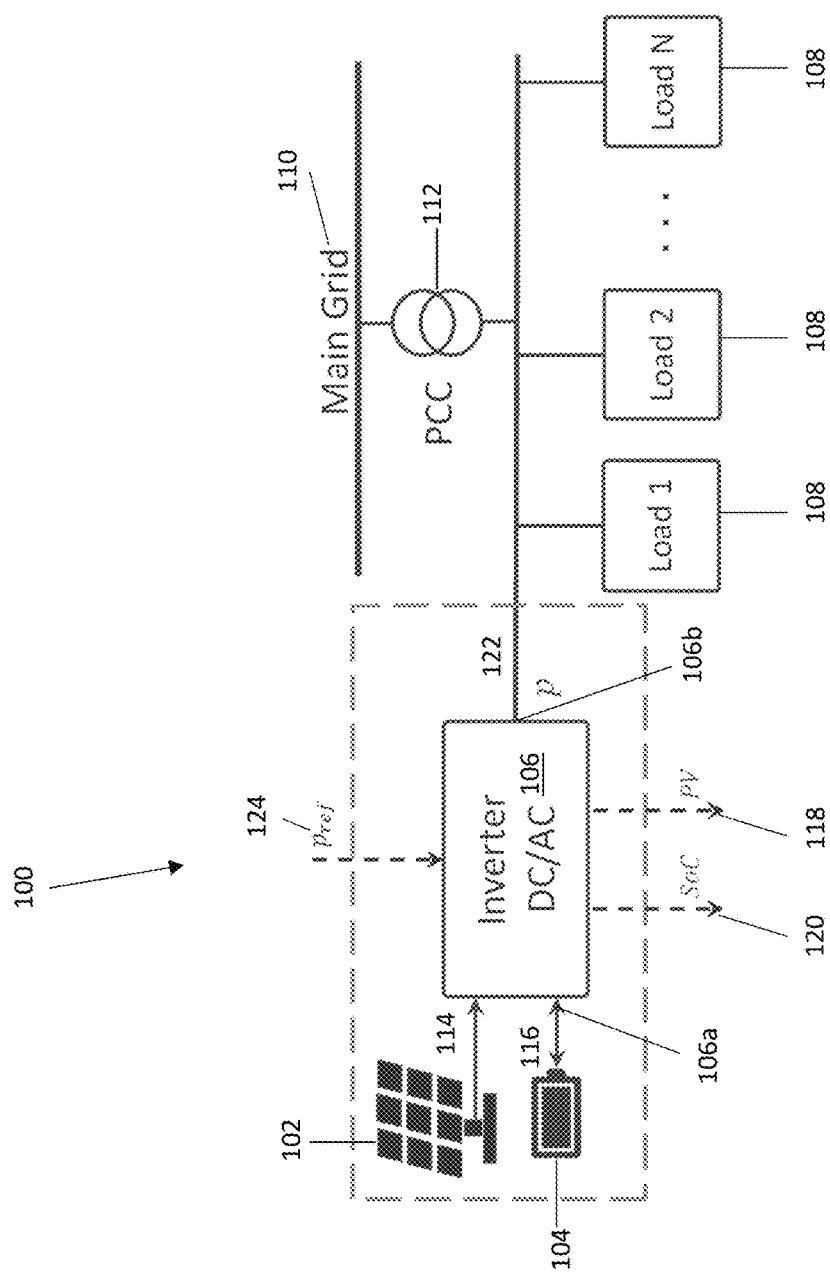
FIG. 1 is a schematic illustration of an embodiment of a microgrid in accordance with the present disclosure.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that may be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all embodiments of this application including, but not limited to, steps in disclosed methods. Thus, if there are a variety of additional steps that may be performed it is understood that each of these additional steps may be performed with any specific embodiment or combination of embodiments of the disclosed methods.

The present methods and systems may be understood more readily by reference to the following detailed description of preferred embodiments and the examples included therein and to the Figures and their previous and following description.

In the following description, certain terminology is used to describe certain features of one or more embodiments. For purposes of the specification, unless otherwise specified, the term "substantially" refers to the complete or nearly complete extent or degree of an action, characteristic, property, state, structure, item, or result. For example, in one embodiment, an object that is "substantially" located within a housing would mean that the object is either completely within a housing or nearly completely within a housing. The exact allowable degree of deviation from absolute completeness may in some cases depend on the specific context. However, generally speaking, the nearness of completion will be so as to have the same overall result as if absolute and total completion were obtained. The use of "substantially" is also equally applicable when used in a negative connotation to refer to the complete or near complete lack of an action, characteristic, property, state, structure, item, or result.

As used herein, the terms "approximately" and "about" generally refer to a deviance of within 5% of the indicated number or range of numbers. In one embodiment, the term "approximately" and "about", may refer to a deviance of between 0.00110% from the indicated number or range of numbers.

Various embodiments are now described with reference to the drawings. In the following description, for purposes of explanation, numerous specific details are set forth in order to provide a thorough understanding of one or more embodiments. It may be evident, however, that the various embodiments may be practiced without these specific details. In other instances, well-known structures and devices are shown in block diagram form to facilitate describing these embodiments.

In accordance with the embodiments disclosed herein, the present disclosure is directed systems and methods that track a specified stored energy level profile for a BESS in a microgrid. The systems and methods including using a control algorithm that tracks the stored energy level profile for the BESS. The controller algorithm includes a Kalman Filter design for a model-based state reconstruction to overcome sensor/communication errors during real-time operation. The latter is important to guarantee the ability of the microgrid to continue its seamless operation during periods of erroneous sensor measurements or flawed communication.

I. Systems and Methods for Controlling Stored Energy Level of BESS

FIG. 1 illustrates one embodiment of a microgrid arrangement 100 of the present disclosure. The microgrid 100 includes a Photovoltaic (PV) DER 102 and a BESS 104 connected to inverter 106. The inverter 106 is connected to at least one the plurality of loads 108 and provides current or power thereto. As shown in this embodiment, PV 102 and BESS 104 produce direct current (DC), whereas the microgrid 100 carries alternating current (AC), and therefore must convert the received current from DC to AC for transmission to the loads 108. The inverter 106 includes one or more DC port connections 106a for connection with DC-producing DERs and one or more AC port connections 106b for connection to one or more loads 108. Microgrid 100 is connected to a main power grid 110 via a point of common coupling (PCC) 112. While FIG. 1 depicts two DERs, it is understood that the microgrid 100 may include any number of DERs as required for efficient operation thereof. In the embodiment illustrated in FIG. 1. PV 102 generates solar power which is provided to inverter 106 as shown at 114. The BESS 104 provides and receives power to the inverter 106 as shown at 116.

In one embodiment, the inverter 106 is configured to provide a measurement of photovoltaic power as indicated by PV at 118 and the State of Charge of the BESS 104 as indicated by SoC at 120. Actual measurement of the real or active power produced by the inverter 106 is indicated by P at 122.

As shown in FIG. 1, inverter 106 operates as current source for one or more loads 108. In addition, the inverter 106 may include a power demand or dispatch signal $P_{ref}$ 124 used to modulate the active power demand at the AC port of the inverter 106. Without such $P_{ref}$, the inverter 106 may store photovoltaic power generated by the PV 102 in the BESS 104 causing the SoC 120 of the BESS.

Using the notation $c(t_k)$ to denote the stored energy or charge of the BESS 104 at time $t_k$, $PV(t_k)$ to denote the solar power produced by PV 102 at time $t_k$ and $P(t_k)$ to denote the actual active power produced by the inverter 106 at time $t_k$, we may write $$c(t_k) = C(t_{k-1}) + \eta_1 \cdot T_S \cdot PV(t_{k-1}) + \eta_2 \cdot T_S \cdot P(t_{-1k}) \quad (1)$$

where $T_S$ denotes the sampling time or time difference between $c(t_k)$ and $c(t_{k-1})$. Furthermore, the coefficients $0 < \eta_1 \leq 1$ and $0 < \eta_2 \leq 1$ may be used to model for the efficiency respectively of the solar power $PV(t_k)$ to charge the BESS 104 and for the active power demand $P(t_k)$ to discharge the BESS 104. The result in Eq. (1) indicates a recursive formula for the computation of the charge $c(t_k)$ at the time sample $t_k$ as function of the charge $c(t_{k-1})$ at the previous time sample $t_{k-1}$ based on a measurement of the solar power $PV(t_{k-1})$ and the measurement of active power $P(t_{k-1})$ at time sample $t_{-1k}$. The unit $c(t_k)$ in Eq. (1) is determined by the product of equivalent units of power used for the solar power $S(t_k)$ and the active power $P(t_k)$ and the unit of time in seconds. Multiplication of $c(t_k)$ with 3600 leads to the units determined by the product of equivalent units of power used for the solar power $PV(t_k)$ and the active power $P(t_k)$ and the unit of time in hour. For example, with $PV(t_k)$ and $P(t_k)$ in the units of kW, $3600 \cdot c(t_k)$ will have the units of kWh.

The BESS 104 may have a limited energy storage capacity capability characterized by the size or capacity of the battery. Denoting the size or capacity of the battery by the parameters C and expressed in the same units as the charge $c(t_k)$, we may define the notion of State of Charge by $$SoC(t_k) = \frac{c(t_k)}{C} \cdot 100$$

where $SoC(t_k)$ is given in units of %.

It may be important to keep the stored energy $c(t_k)$ or the equivalent state of charge $SoC(t_k)$ of the BESS 104 within operation limits to avoid over-charging or under-charging of the BESS 104. Keeping the stored energy level of the BESS 104 within operating limits may be done by real-time monitoring and control.

Figure 2:
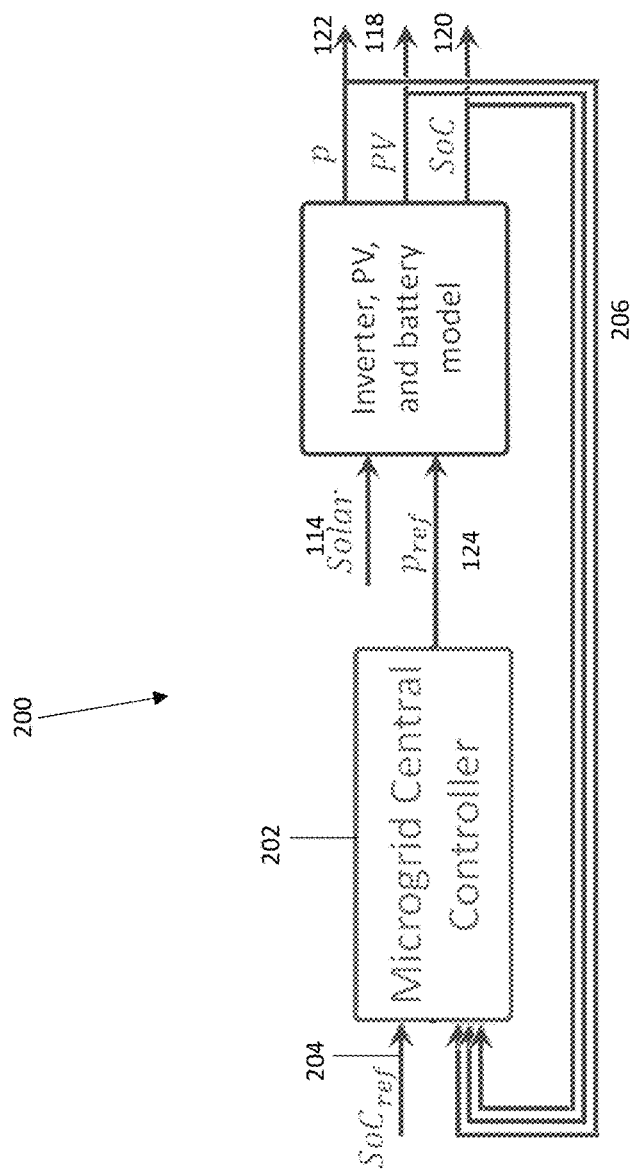
FIG. 2 is a schematic illustration of an embodiment of a microgrid controller used in connection with a microgrid in accordance with the present disclosure.

FIG. 2 is a schematic illustration of a microgrid controller 202 configured to operate in connection with the inverter 106. In one embodiment, the microgrid controller 202 computes the inverter active or real power dispatch signal $P_{ref}$ 124 by tracking or following an SoC reference signal $SoC_{ref}$ illustrated as 204. As shown in FIG. 2, a preferred embodiment may comprise real-time monitoring and control to keep the stored energy $c(t_k)$ or the equivalent state of charge $SoC(t_k)$ of the BESS 104 within operation limits. In the preferred embodiment, measurements of the state of charge $SoC(t_k)$, solar power $PV(t_k)$ and active power produced by the inverter $P(t_k)$ may form a feedback data stream 206 and a desired or reference state of charge $SoC(t_k)$ may be the reference data stream 204. In another embodiment, measurements of the charge $c(t_k)$, solar power $PV(t_k)$ and active power produced by the inverter $P(t_k)$ may form a feedback data stream 206 and a desired or reference charge $c(t_k)$ may be the reference data stream 204.

Measurements of the stored energy $c(t_k)$ or the equivalent state of charge $SoC(t_k)$ of the BESS 104 available in the feedback stream of FIG. 1 may be characterized by $$x(t_k) = x(t_{k-1}) + \eta_1 \cdot T_S \cdot PV(t_{k-1}) + \eta_2 \cdot T_S \cdot P(t_{k-1}) + w(t_k) \quad (2)$$

and $$c(t_k) = H(t_k) \cdot x(t_k) + v(t_k) \quad (3)$$

where the two noise contributions $v(t_k)$ in Eq. (2) and $w(t_k)$ in Eq. (3) may be used to denote, respectively, process noise and measurement errors present on the measurement of $c(t_k)$.

The process noise $w(t_k)$ in Eq. (2) may have a mean value of 0 and a variance Q. The process noise $w(t_k)$ is used to model the effect of random fluctuations in the dynamic progression of the stored energy $x(t_k)$ of the BESS 104. It may be observed from Eq. (1) that $x(t_k) = c(t_k)$ in case $w(t_k) = 0$.

The measurement noise $v(t_k)$ in Eq. (3) may have a mean value of 0 and a variance R. The measurement noise $v(t_k)$ is used to model the effect of random fluctuations in the measurement of the stored energy $c(t_k)$ of the BESS 104. Finally, the amplification $H(t_k)$ in Eq. (3) is used to indicate missing or erroneous data points of the stored energy $c(t_k)$ or the equivalent state of charge $SoC(t_k)$. In case $H(t_k)=1$, the mean value of $c(t_k)$ will be equal to the mean value of $x(t_k)$. However, $H(t_k) \neq 1$, the BESS 104 may report an erroneous measurement or a missing measurement. In case of a missing measurement, one may assuming $c(t_k) = c(t_{k-1})$, making $H(t_k) = 0$ and $v(t_k) = -\eta_1 \cdot T_S \cdot PV(t_{k-1}) - \eta_2 \cdot T_S \cdot P(t_{k-1}) - w(t_k)$.

As shown in FIG. 2, the microgrid controller 202, using a feedback control algorithm, may continuously process a reference data stream 204 and a feedback data stream 206 to compute a desired active power dispatch signal $P_{ref}(t_k)$ at time $t_k$ for the inverter 106 to either charge, discharge, or level the energy or charge level of the BESS 104. In a preferred embodiment, the feedback control algorithm may be the combination of switching logic and dynamic filters so that that the absolute or relative measure of the stored energy level of the BESS 104 is tracking or following the reference data stream 204 representing the desired absolute or relative measure of the stored energy level of the BESS 104.

Figure 3:
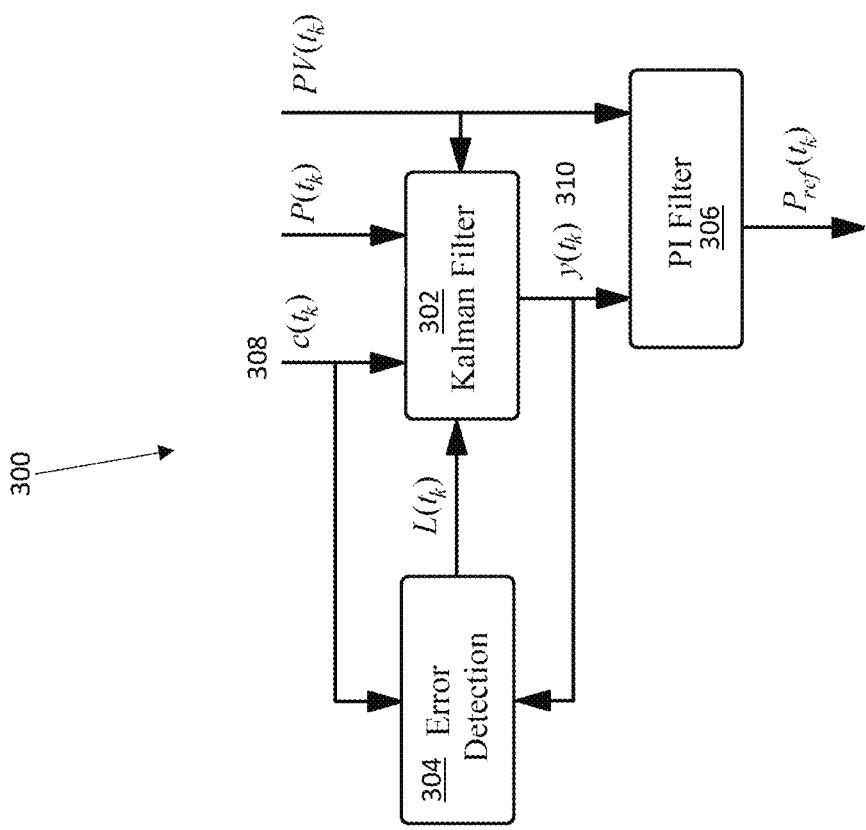
FIG. 3 is a flowchart illustrating one method for monitoring and controlling power within a microgrid in accordance with the present disclosure.

FIG. 3 provides an overview of a discrete-time feedback control method 300 used by the microgrid controller 202 to compute the inverter active or real power dispatch signal $P_{ref}$ 124 from the SoC measurement signal 120 and the desired SoC reference signal $SoC_{ref}$ 204. To accommodate the process noise $w(t_k)$ as indicated in Eq. (2), measurement noise $v(t_k)$ and erroneous measurements $H(t_k) \neq 1$ of the stored energy $c(t_k)$ in Eq. (3), the feedback control algorithm may first process the measurement $c(t_k)$ via a Kalman filter 302. The Kalman filter 302 may provide an estimate $y(t_k)$ of the stored energy $c(t_k)$ or the equivalent state of charge $SoC(t_k)$ of the BESS 104 via the measurement update:

$$y(t_k) = (1 - L(t_k)H(t_k))y(t_{k-1}) + \eta_1 \cdot T_S \cdot PV(t_{k-1}) + \eta_2 \cdot T_S \cdot P(t_{k-1}) + L(t_k)c(t_k) \quad (4)$$

where $H(t_k)$ was given in Eq. (3) and the Kalman gain $L(t_k)$ is computed by:

$$L(t_k) = P(t_k) \cdot \frac{H(t_k)}{H(t_k)^2 \cdot P(t_k) + R} \quad (5)$$

where R is the variance measurement noise $v(t_k)$ in Eq. (3) and $P(t_k)$ is the progression of the covariance given by the recursive formulation:

$$P(t_k) = P(t_{k-1}) + \frac{P(t_{k-1})^2 \cdot H(t_k)}{H(t_k)^2 \cdot P(t_{k-1}) + R} + Q \quad (5)$$

where Q is the variance measurement noise $w(t_k)$ in Eq. (2). The combination of Eq. (2) and Eq. (4) leads to an error $e(t_k) = x(t_k) - y(t_k)$ that can be described by the recursive error equation:

$$e(t_k) = (1 - L(t_k)H(t_k))e(t_{k-1}) + w(t_{k-1}) - L(t_k)v(t_{k-1}) \quad (6)$$

For measurements of the stored energy $c(t_k)$ in Eq. (3) without errors it is known that $H(t_k)=1$ and the filter gain $L(t_k)$ may be chosen as a fixed and time independent gain $L(t_k) = L$ with the condition $0 < L < 2$ to ensure the mean value of $e(t_k) = x(t_k) - y(t_k)$ converges to 0 according to the recursive error equation (6).

Because there is no explicit knowledge on when errors occur in the measurement of the stored energy $c(t_k)$ in Eq. (3) or equivalently, when $H(t_k) \neq 1$, significant errors $e(t_k)$ may indicate deviation from $H(t_k)=1$. In a preferred embodiment, Kalman filter 302 may include an error detection algorithm 304 based on a threshold:

$$|e(t_k)| = |y(t_k) - c(t_k)| > \epsilon \quad (7)$$

for detecting erroneous errors in the measurement of the stored energy $c(t_k)$. Once an erroneous measurement is flagged according to Eq. (7), the Kalman filter 302 may switch to a Kalman gain $L(t_k)=0$. Where $L(t_k)=0$, the estimate $y(t_k)$ in Eq. (4) may reduce back to the format of Eq. (1) where the Kalman filter reconstruct the of the stored energy $y(t_k)$ of the BESS 104 with no dependence on the measured store energy $c(t_k)$ of the BESS 104.

Following the flow diagram of the control algorithm in FIG. 3, the filtered value $y(t_k)$ of the measurement of the stored energy $c(t_k)$ of the BESS 104 may be to send a Proportional and Integral (PI) filter 306 described by $$P_{ref}(t_k)=P_{ref}(t_k)+K_p \cdot d(t_k)+K_i \cdot T_S \cdot d(t_{k-1})+\eta_1 \cdot PV(t_k) \quad (7)$$

to compute the power demand or dispatch signal $P_{ref}(t_k)$ at the time sample $t_k$, where $d(t_k)=SoC_{ref}(t_k)-SoC(t_k)$ is the error between the desired SoC reference $SoC_{ref}(t_k)$ and the measured SoC value $SoC(t_k)$. The parameter $\eta_1$ with $0<\eta_1 \le 1$ is again the efficiency respectively of the solar power $PV(t_k)$ to charge the battery similar as in Eq. (1). Additional filtering, slew rate, and amplitude limits can be imposed onto the dispatch signal $P_{ref}(t_k)$ to stay within the operating range of the inverter 106.

Figure 4:
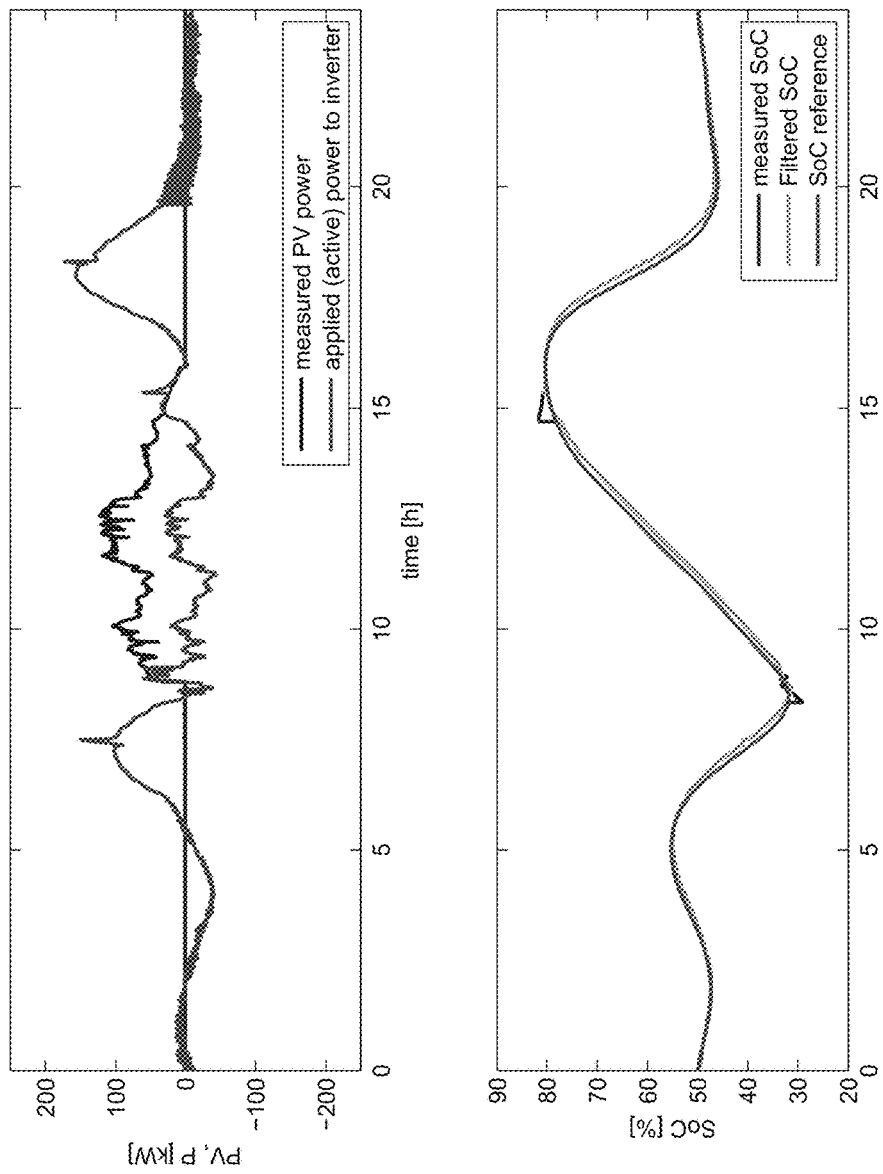
FIG. 4 are graphs depicting an example of monitoring and controlling power within a microgrid in accordance with the present disclosure.

FIG. 4 illustrates the results of the implementation of the real-time energy control to dispatch power demand signal $P_{ref}(t_k)$ to the inverter 106 of a BESS 104, and track a desired SoC profile $SoC_{ref}(t_k)$ with the measurements of the state of charge $SoC(t_k)$ of a BESS. The experimental results of FIG. 4 have been obtained by the implementation of a microgrid with a BESS 104 and a PV DER 102 at a medical facility microgrid in Northern California. Measurements of the solar power $PV(t_k)$, state of charge $SoC(t_k)$ of a BESS 104 and resulting power demand signals $P(t_k)$ of the inverter 106 are implemented via Modbus communication over TCP/IP with an update rate of 1 Hz. The feedback control process described in FIG. 3 along with the Kalman filter 302, error detection logic 304, and Proportional and Integral filter 306 is coded in C++ and implemented in Schweitzer Engineering Laboratories (SEL) 3355 computer. The inverter power dispatch and PV power are shown in the top of FIG. 4. The performance on SoC tracking is shown in the bottom of FIG. 4. The SoC may be tracked with the subject matter, despite sporadic erroneous measurements in the SoC. The microgrid controller 202 may also track the desired SoC profile with a single charge/discharge cycle through the day, maintaining the SoC of the BESS between 30% and 80%, despite the highly variable PV power generation present while running the experiment.

II. Experimental

The following examples are provided in order to demonstrate and further illustrate certain preferred embodiments and aspects of the present disclosure and are not to be construed as limiting the scope thereof.

A. Features and Capabilities of the Microgrid Controller

A control system for a microgrid was developed for use at the Kaiser Permanente Richmond Medial Center (KPRMC). The microgrid controller was developed by the partnership of the University of California San Diego (UCSD), OSISoft and Florida State University (FSU) Center for Advanced Power Systems (CAPS) team using Virtual Microgrid (VM) Real-Time Digital Simulator (RTDS) test at FSU CAPS. This development of the microgrid controller has been executed under the auspices of Charge Bliss, Inc. and funded by the California Energy Commission (EPC-14-080) and match funding from various sources. The system included autonomous SoC-gated and Demand Limit real power control, enables economical (real) power scheduling to reduce cost of electricity for the KPRMC site. This will be the de-facto operating mode of the microgrid controller at the KPRMC site to provide maximum economic benefit for the microgrid at the KPRMC site and, as such, will be used to validate the long-term performance validation of the microgrid controller at the KPRMC site.

1. Overview of Microgrid Controller

For the microgrid development, UCSD is responsible for the development of the actual control algorithm, whereas OSISoft is involved in the development of the software of the control algorithm to be on top of the PI system for performance monitoring and controller configuration parameters in the OSISoft Asset Framework (AF) database.

Figure 5:
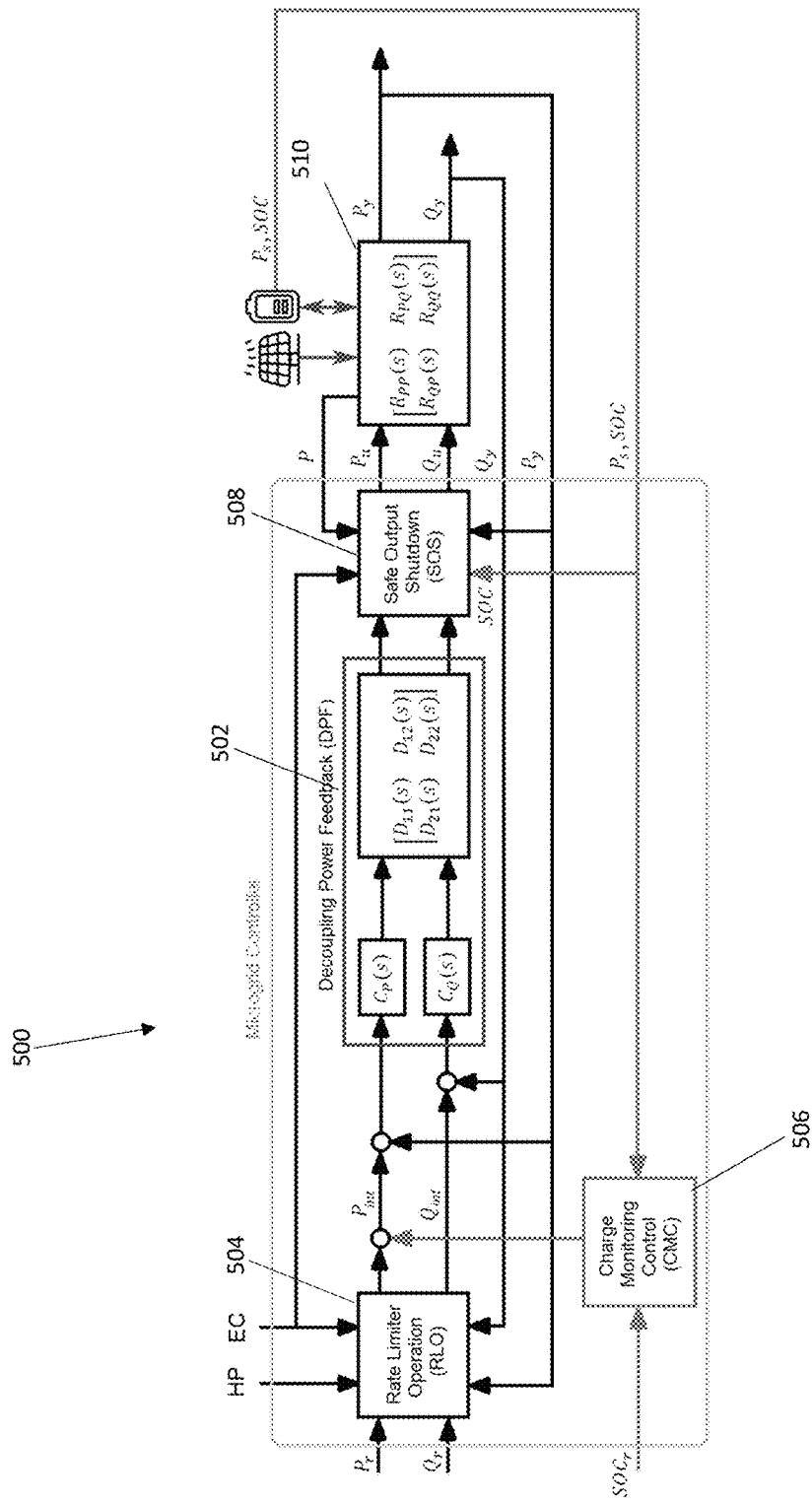
FIG. 5 is a functional block diagram of a microgrid controller applied to a Simplified Dynamic Power Model (SDPM).

FIG. 5 illustrates a functional block diagram of an exemplary microgrid controller 500 applied to a Simplified Dynamic Power Model (SDPM) 510 as used at the KPRMC site. The microgrid controller 500 is configured to compute real/reactive power demand signal (P', Q') for an inverter 106 or controllable DER (such as PV 102) to ensure the real/reactive power pair ($P_\zeta$, $Q_\zeta$) at the POI/PCC 112 tracks or follows a specified real/reactive power reference pair ($P_\#$, $Q_\#$). Straight arrows/lines indicate data or information flow for the microgrid controller 500.

As shown in FIG. 5, the microgrid controller 500 consists of four main components, a decoupling power feedback (DPF) module 502, a rate limiter operation (RLO) module 504, a charge monitoring and control (CMC) module 506, and a safe output shutdown (SOS) module 508. The DPF 502 implements the control algorithm to allow for decoupled/reactive feedback control. The RLO 504 functions to compute rate limited real/reactive power reference signals with the possibility to allow for independently specified external real/reactive power reference pair ($P_\#$, $Q_\#$). The CMC 506 functions to adjust real power reference signals to control the SoC of the BESS 104. The SOS 508 enables operator and automatic shutdown of the microgrid controller 500 in case of islanding switching.

The four distinctive components of the microgrid controller 500 are designed to facilitate safe islanding switching of the microgrid controller 500 supporting two main features. The first feature is the decoupling real/reactive power control at the POI/PCC 112 via synchrophasor feedback. This feature provides support for the Automatic Demand Response (ADR) at the KPRMC site to track (rate limited) real and reactive power reference signals specified by an Independent System Operator (CAISO). The second main feature is the SoC-gated control of the BESS 104 and real power demand limitation at the POI/PCC 112 via synchrophasor feedback. This feature provides support to maximize the economic benefit of the microgrid controller 500 for the KPRMC site by modulating power flow at the POI/PCC 112 according to daily time-varying and seasonal Time-of-Use pricing and daily time-varying and seasonal Demand Limit pricing accrued over a monthly billing cycle.

The microgrid controller 500 will support the specification of real/reactive ($P_\#$, $Q_\#$) power flow reference signals via either an independent system operator (CA)ISO or autonomously computed (ramp rate limited) real/reactive ($P_\#$, $Q_\#$) power flow reference signals based on economic incentives to minimize the cost of electric energy and demand charges for the microgrid at the KPRMC. A more detailed explanation of the features follows, providing the motivation of the design and choice of the proposed full functional diagram of the microgrid controller 500 shown in FIG. 5.

2. Use of Synchrophasor Data for Feedback

Synchronized voltage and current phasor may be measured with a Phasor Measurement Unit (PMU) and provide real-time and high frequent updates on the electrical properties and real/reactive power flow of the microgrid 100 at the PCC/POI 112. The use of synchrophasor data for feedback has been integral part of the development of the microgrid controller 500 as synchrophasor data provides valuable information to control power flow at the PCC/POI 112 using feedback.

Unanticipated real and reactive power fluctuations at the PCC/POI 112 due to load variations or intermittency in PV power production may be measured in real-time by synchrophasor data. As a result, those unanticipated real/reactive power fluctuations may be compensated in real-time instead of trying to predict and plan for those load fluctuations.

The voltage phasor v and a current phasor i are related via Ohm's law v=gi, where g denotes the (Thevenin equivalent) complex impedance of the electric AC network that related the voltage and current. Typically, the impedance is a dynamic filter, that could be represented by a transfer function g(s) in the Laplace variable s and the complex impedance g is found by evaluating g(s) at s=jω for ω=2πf where f=60 Hz is the fundamental AC frequency. As a result, g=g(jω) will be a complex number g=Ge$^{789}$ where $$G=|g(j\omega)|, \varphi_g = \angle g(j\omega)$$

With a given voltage phasor v=Ve$^{78}$@ driving an electric network, the resulting steady state current phasor i=Ie$^{78}$Bw may be computed from the impedance by complex number division and results into i=Ie$^{78}$B, where $$I = G, \frac{v}{\;} \quad \varphi_C = \varphi_D - \varphi$$

using the polar coordinate representation of the phasors and the impedance g=Ge$^{789}$. From this analysis it is clear that the angle difference $\varphi_D - \varphi_C$ between the voltage and current phasor is completely determined by the phase angle $\varphi_=$ of the impedance at the fundamental AC frequency.

Consequently, real and reactive power flow for a balanced 3 phase AC electric network defined by the Positive Sequence $$P = 3VI \cos(\varphi_D - \varphi_C) = 3VI \cos J\varphi_= K$$

$$Q = 3VI \sin(\varphi_D - \varphi_C) = 3VI \sin J\varphi_= K$$

are completely determined by the impedance g. Moreover, it can be seen that the real P and reactive power Q are inherently coupled due to Ohm's law by the property of the Thevenin equivalent complex impedance g of the electric network that relates the voltage and current.

What is also interesting to observe from this analysis is that the characteristics of the Thevenin equivalent complex impedance g at the Point of Interest (POI) of an electric network can be altered if the real P and reactive Q power flow could be controlled independently from within that electric network. For example, ensuring that the reactive power flow Q=0, ensures that $\varphi_==0$ or $\varphi_==\pi$ rad, making g=G or g=−G a purely resistive load. The possibility to make g=−G with Q=0 and P<0 ensures negative real power flow for energy "storage" instead of energy "delivery". The concept of independently controlling real and reactive power has been recognized by Charles Wells and OSIsoft who were brought to this project to enable decoupled power control. The decoupled power control will enable independent power flow specification for both real and reactive power at the PCC/POI 112 of the microgrid 100.

3. Use of Dynamic Models Real and Reactive Power Flow

To be able to tune and guarantee the stable operation of a synchrophasor data feedback-based microgrid controller 500, real/reactive power control at the PCC/POI 112 is first modelled in a dynamic model. The Simplified Dynamic Power Model (SDPM) 510 models both the dynamic behavior of power flow and the dynamic coupling between (P', Q') demand signals for the inverter 106 and the (P$_()$, Q$_()$) power flow pair at the POI, as illustrated in FIG. 6.

Figure 6:
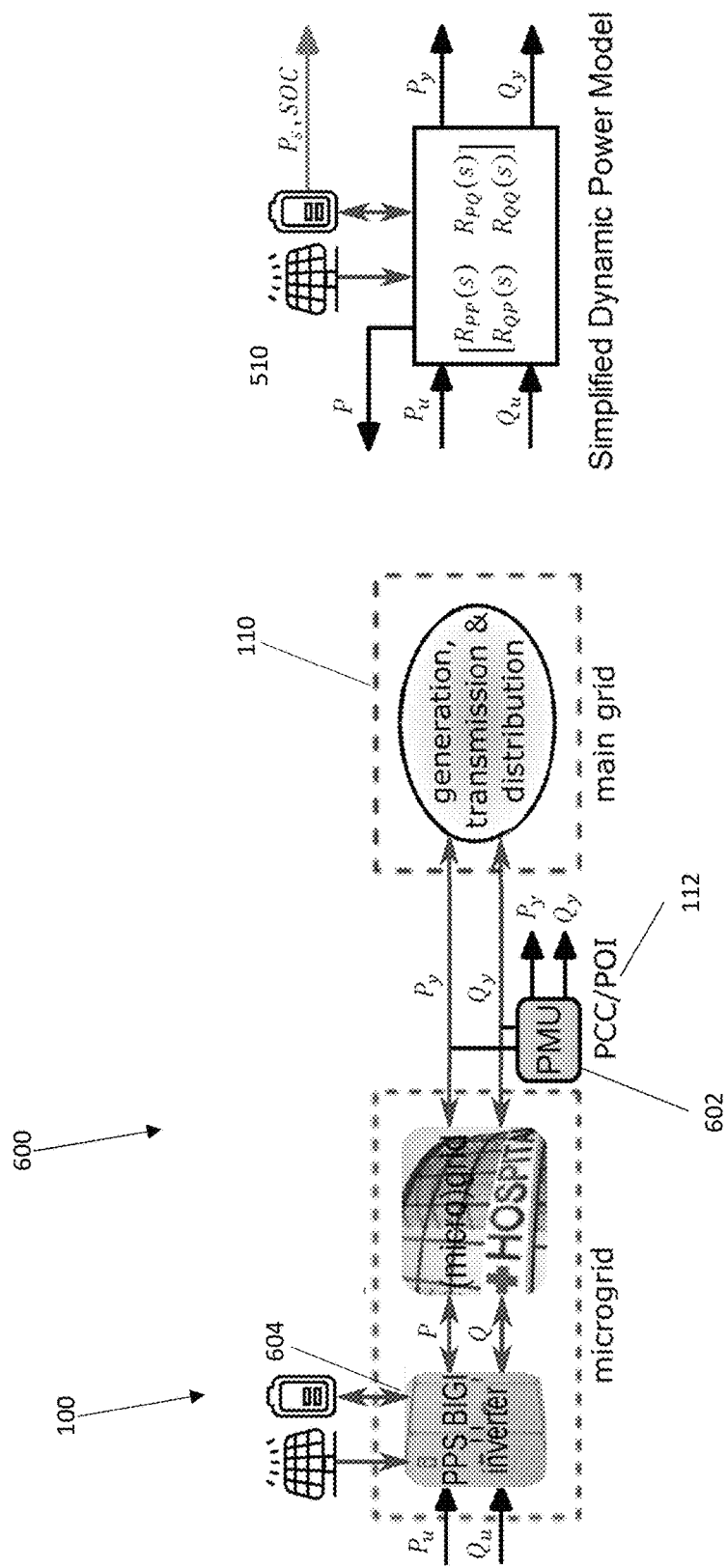
FIG. 6 is a functional block diagram of an SDPM modeling the dynamics of the microgrid.

FIG. 6 illustrates one embodiment of a system 600 used at the KPRMC site. FIG. 6 shows that the SDPM 510 models the dynamics from a (smart) inverter 106 real/reactive power demand signal (P', Q') to real/reactive power flow pair (P$_()$, Q$_()$) at the POI/PCC 112 to the main utility grid 110 and measured by a Phasor Measurement Unit (PMU) 602. Actual power flow is indicated by hashed arrows/lines, whereas straight arrows/lines indicate data or information flow.

FIG. 6 shows the concept for the system 600 used at the KPRMC site wherein the one of the DERs (such as PV 102) is replaced by the Princeton Power Systems (PPS) BIGI inverter 604 that has 2 DC connections. Actual power flow is indicated by hashed arrows/lines, whereas straight arrows/lines indicate data or information flow. One DC connection is used for the directional (real) power flow from the PV 102, whereas the other DC connection is used for the bi-directional (real) power flow to the Battery Energy Storage System (BESS) 104.

Following the specification of the PSS BIGI inverter 604, real/reactive power demand signals indicated by the pair (P', Q') are specified to the PSS BIGI inverter 604 and (the sum of the) DC power coming from the PV 102 and the BESS 104 is used to modulate real/reactive power indicated by the pair (P, Q) according to the specification of real/reactive power demand pair (P', Q'). FIG. 6 also indicates the use of a PMU 602 to measure the resulting real/reactive power flow pair (P$_()$, Q$_()$) at the POI/PCC 112 of the microgrid 100. It is important to recognize that real and reactive power flow (P, Q)=(P', Q') satisfied locally at the PSS BIGI terminals does not guarantee that these exact same independently specified power flow pair (P$_()$, Q$_()$) is obtained at the POI terminals of the microgrid 100. The SDPM 510 indicated on the right in FIG. 6 is intended to capture the dynamics of the power flow from the real/reactive power demand pair (P', Q') to the real/reactive power POI/PCC pair (P$_()$, Q$_()$).

In addition, the SDPM 510 also incorporates measurements of the State of Charge (SoC) of the BESS 104, the AC real power P created by the PPS BIGI inverter 604 and PV or Solar power P$_N$ used by the PSS BIGI inverter 604. These measurements may be provided by the PSS BIGI inverter, but the AC real power measurement P can also be obtained independently with an additional PMU installed on the PPS BIGI inverter terminals. Although these additional measurements will not be used in the actual decoupling real/reactive power control, these measurements are important to guarantee safe operation of the controller 500 and monitoring of the SoC to ensure the BESS 104 is not over- or undercharged during decoupling power control operation.

It should be pointed out that the terminology and nature of the SDPM 510 is to capture only the dynamic nature of the power flow from a DER command signal (real/reactive power demand for an inverter) to the power flow at the POI/PCC 112 of the microgrid. The simplified nature of the model indicates that the model does not capture each and every dynamic element (conductors, capacitors, transformers, etc.) in the microgrid to be controlled, but instead focuses on the dynamic aspects relevant for power flow control only.

For control design purposes, the dynamics of power flow in the SDPM 510 is denoted by a 2×2 multivariable transfer function R(s) and is given by $$OQP(((s)P=QRRTSSS((ss))RRTTST((ss))U$$
$$QQP'((ss))U(s)$$

with the entries $R_{SS}(s)$ for real power P'(s) demand at the inverter to real power $P_c(s)$ flow result at the POI $R_{TT}(s)$ for reactive power Q'(s) demand at the inverter to reactive power $Q_c(s)$ flow result at the POI.

$R_{TS}(s)$ for real power P'(s) demand at the inverter to reactive power $Q_c(s)$ flow coupling at the POI.

$R_{ST}(S)$ for reactive power Q'(s) demand at the inverter to real power $P_c(s)$ flow coupling at the POI.

For modeling purposes, it is assumed that the entries of 2×2 multivariable model R(s) is given by rational transfer functions $$QRR_{TS}SS((ss))RRST_{TT}((ss))U = \begin{Vmatrix} num_{SS}(s) & num_{ST}(s) \\ num\underline{den}_{Tss}((ss))numden_{TTS}((ss)) \\ den_T(s) & den_T(s) \end{Vmatrix}$$

and formulated as a ratio of numerator and denominator polynomials in the Laplace variable s.

The individual rational transfer function models are estimated by performing experiments on the (virtual) microgrid and collecting time domain data the real/reactive (P', Q') power demand signals for the inverter 106 and the real/reactive($P_c$, $Q_c$) power flow pair at the POI. The time domain data of "input" (P', Q') and "output" ($P_c$, $Q_c$) signals are used to estimate the parameters of the numerator and denominator coefficients of the rational transfer function models in either continuous- or discrete-time. For the parameter estimation, the step response-based realization methods developed at UCSD or well-known Prediction Error Minimization (PEM) methods developed by Ljung (1999) are used.

The advantage of the data-based modeling approach is that models are directly formulated based on experimental data instead of complicated circuit models that would (a) increase model complexity and (b) increase model uncertainty due to the lack of a complete set of parameter information for the circuit model.

4. Decoupling Real/Reactive Power Control Via Synchrophasor Feedback

Figure 7:
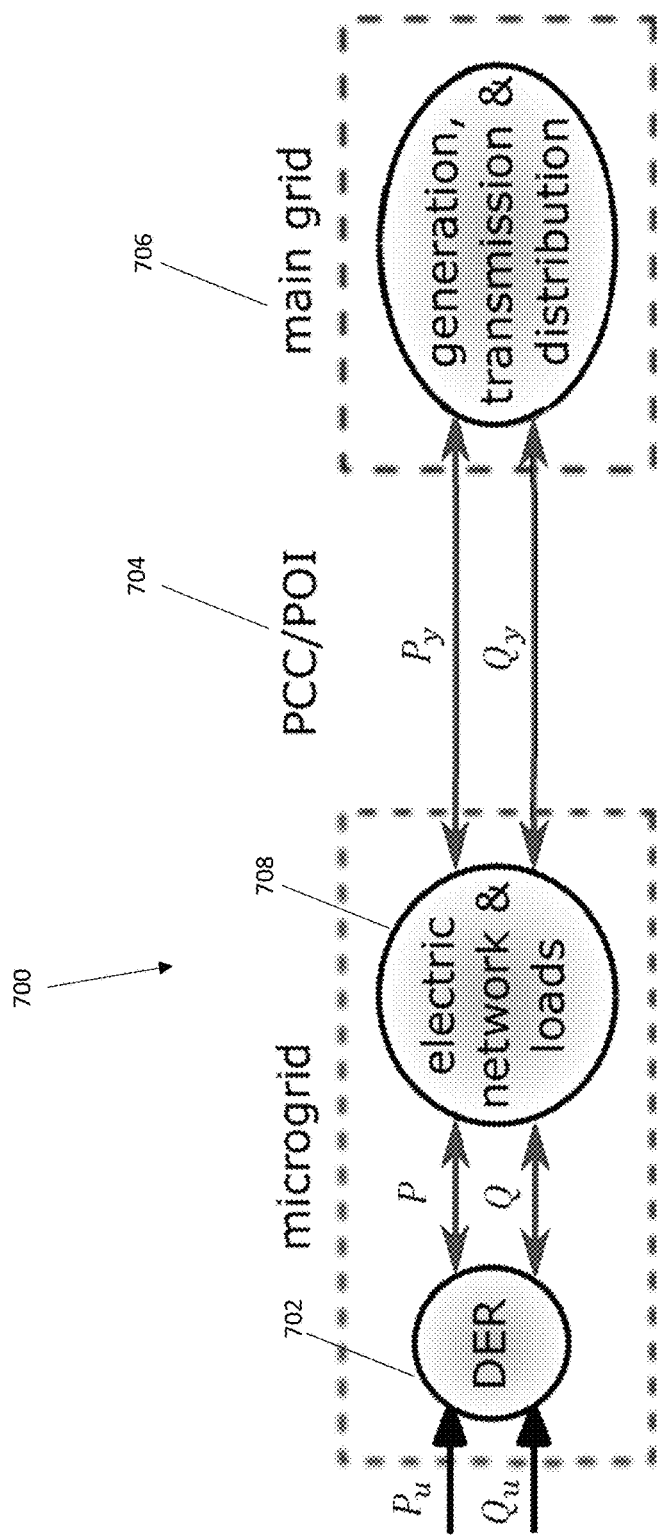
FIG. 7 is a functional block diagram of a microgrid which includes a distribution energy resource (DER).

The idea of independently controlling the real and reactive power flow is well established and common practice in modern microgrids. FIG. 7 is a schematic diagram of one embodiment of a microgrid 700 which includes a DER 702 subject to a real/reactive power (P', Q') demand requirement in the microgrid, producing real/reactive power pair (P, Q) at the terminals of the DER 702 and a real/reactive power pair ($P_c$, $Q_c$) at the Point of Interest (POI) or Point of Common Coupling (PCC) 704 to the main utility grid 706. As illustrated in FIG. 6, controlling real and reactive power flow is performed by introducing the DER 702 into the electric network 708 for which real P and reactive Q power flow demands may be specified independently. Clearly, modern (smart) inverters that may be part of the DER 702 may accept such independent real and reactive (P, Q) power pair demands and are used for the practical implementation of this idea to control power flow at the PCC 704 of the microgrid 700 to the main grid 706.

As mentioned earlier, a DER 702 implemented via a (smart) inverter only makes sure the independent real and reactive power flow demand denoted by (P', Q') is satisfied locally at the inverter terminals via (P, Q) and typically does not guarantee that these exact same independently specified power flow pair ($P_c$, $Q_c$) is obtained at the POI terminals of the electric network 708. It is important to guarantee a specified ($P_c$, $Q_c$) pair at the POI terminals, as it is the point of interaction with the utility where the Thevenin equivalent complex impedance needs be altered.

The Decoupling Power Feedback (DPF) module 502 in the microgrid controller 500 uses the Simplified Dynamic Power Model (SDPM) 510 R(s) to formulate a decoupling filter to decouple the power flow. Once the power flow is decoupled, standard Proportional, Integral and Derivative (PID) control algorithms are used to provide real-time feedback of the ($P_c$, $Q_c$) power flow pair at the POI. Details on the computation and tuning of the decoupling filter and the PID control algorithms is as follows.

The decoupling filter, denoted by D(s), is also a 2×2 multivariable transfer function that is essential for: 1) The decoupling of real/reactive ($P_c$, $Q_c$) power flow pair at the POI; and 2) The separate design of real power feedback controllers $C_S(s)$ and a reactive power feedback controller $C_T(S)$ to control and track real/reactive ($P_\#$, $Q_\#$) power flow reference signals at the POI. The combination of 2×2 multivariable decoupling filter D(s) given by $$D(s)=QDDbbcb((ss))DDbccc((ss))U$$

and the two independent real power feedback controllers $C_S(s)$ and a reactive power feedback controller $C_T(s)$ construct the control algorithm in the DPF module 510.

The control algorithm in the DPF module 510 operates on the 2×2 multivariable power flow transfer function R(s) from inverter demand to POI as depicted earlier in FIG. 7. It should be noted that the control algorithm in the DPF module 510 aims at decoupling the real/reactive ($P_c$, $Q_c$) power flow pair at the POI. It is achieved by the separate design of the 2×2 multivariable decoupling filter D(s) and the decoupling design of PID controllers $C_S(s)$ and $C_T(S)$ respectively for real and reactive power flow tracking.

Due this decoupling design, the controller 500 will achieve the decoupling of real and reactive ($P_c$, $Q_c$) power flow pair at the POI of the microgrid. This means that any unanticipated real or reactive power flow variations created within the microgrid (conceptually characterized as "disturbances") are independently controlled and mitigated by the control algorithm in the DPF module 510. In addition, the controller 500 provides independent tracking of real/reactive ($P_\#$, $Q_\#$) power flow reference signals at the POI. This means that an Independent System Operator (such as CAISO) may specify these real/reactive ($P_\#$, $Q_\#$) power flow reference signals to accomplish a desired real/reactive power flow over the POI of the microgrid.

The independent tracking is especially important to achieve to desired feature to guarantee a specified ($P_c$, $Q_c$) power flow pair at the POI terminals, as it is only at the POI where the Thevenin equivalent complex impedance g of the microgrid needs be altered. The microgrid controller 500 will support the specification of real/reactive ($P_\#$, $Q_\#$) power flow reference signals via either an independent system operator (CA)ISO or an autonomously computed (ramp-rate limited) real/reactive ($P_\#$, $Q_\#$) power flow reference signals based on economic incentives to minimize the cost of electric energy for the microgrid.

The information on the 2×2 multivariable transfer function R(s), modeling the power flow from inverter demand (P', Q') to POI power flow ($P_C$, $Q_C$), may be used to formulate a decoupling filter $$D(s)=QDDbbcb((ss))DDbccc((ss))U=d(1s)$$
$$Q-numnumTITS((ss))-numnumSSST((ss))U$$

where d(s) is a user-chosen common denominator polynomial to ensure the 2×2 x multivariable decoupling filter D(s) is a (strictly) proper transfer function. In case of a static (non-dynamic) decoupling gain, the denominator d(s) may be chosen as d(s)=1, but in general the polynomial is used to implement some form of low pass filtering in the 2×2 multivariable decoupling power feedback (MDPF) controller. With the above definition of the decoupling filter D(s) it is easy to verify that the decoupling filter modifies the 2×2 coupled real/reactive power flow dynamics R(s) into a 2×2 decoupled real/reactive power flow dynamics Re(s) given by $$Re(s)=R(s)D(s)=O^{Rebb}0^{(s)}Re_{cc}{}^0(s)P$$

where $Re_{bb}(s)$ and $Re_{cc}(s)$ are modified versions of $R_{bb}(s)$ and $R_{cc}(s)$ due to the decoupling filter D(s) and its common denominator polynomial d(s). Clearly, Re(s)=R(s)D(s) is decoupled due to the zero off-diagonal terms and once D(s) is chosen, the transfer functions $Re_{bb}(s)$ and $Re_{cc}(s)$ are known and the decoupled controllers $C_S(s)$ and $C_T(s)$ for real/reactive power flow control and tracking may be designed.

The controllers $C_S(s)$ and $C_T(s)$ are given by standard PID controllers and given by the transfer functions $$CS(s)=Kgg+Kigs+KCg/s \quad C_T(s)=Kgk+Kiks+KCk/s,$$

where the controller parameters for the proportional gain $K_g$, derivative gain $K_i$ and integral gain $K_C$ are tuned on the basis of the models $Re_{bb}(s)$ and $Re_{cc}(s)$ obtained via the decoupled real/reactive power dynamics Re(s). The actual implementation of the PID controllers is done is in discrete time and incorporates anti-windup capabilities to avoid integral wind-up due to amplitude and rate constraints on the inverter power demand signals (P', Q'). algorithm $$C(s)=QCCbbcb((ss))CCbccc((ss))U=QDDbbcb((ss))$$
$$DDccbc((ss))U \; QCS0(s)CT0(s)U$$

as stated before. The controller is designed via the separate design of D(s), $C_S(s)$ and $C_T(s)$ based on the coupled real/reactive power flow dynamics R(s).

It should be noted that the final multivariable decoupling power feedback (MDPF) control algorithm is a true 2×2 multivariable control algorithm.

5. State of Charge Gated Control Via Real Power Modulation

The PPS BIGI inverter 604 is limited to 250 kVA total AC power output. This means that real and/or reactive power demand (P', Q') signals to the inverter must be limited by $$1\sqrt{P_u^2+Q^2} \le 250, \text{kVA}$$

to ensure the control algorithm in the DPF module 502 does not saturate the inverter power output. Furthermore, large real and/or reactive power demand (P', Q') signals may also drain or overcharge the battery. As a consequence, the microgrid controller 500 must be given real/reactive power reference signals ($P_\#$, $Q_\#$) that will incorporate provisions to avoid inverter 106 output saturation and/or BESS 104 over- and under-charging.

Figure 8:
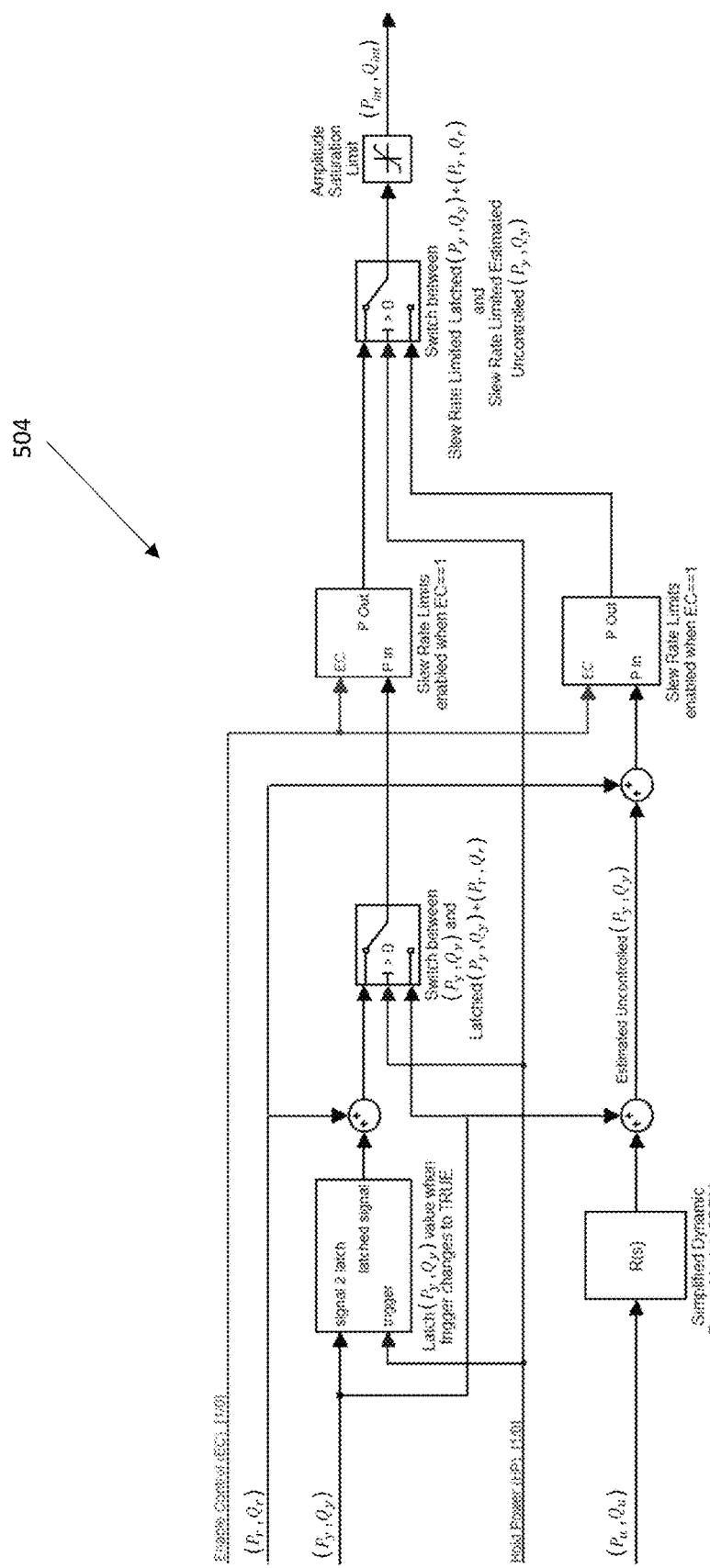
FIG. 8 is a block diagram of a Rate Limiter Operation (RLO) module of a microgrid controller.

The Rate Limiter Operation (RLO) 504 module computes (internal) real/reactive power reference signals ($P_{C_{qr}}$, $Q_{C_{qr}}$) based on a rate limited version of the uncontrolled real/reactive power signals at the POI/PCC 112. FIG. 8 is a block diagram of one embodiment of RLO module 504. The RLO module 504 uses the real/reactive POI/PCC power $JP_C$, $Q_C K$ and the real/reactive demand power (P', Q') to formulate a power disturbance estimator for the (autonomous) computation of ramp-rate limited power reference signals ($P_{C_{qr}}$, $Q_{C_{qr}}$) adjusted by an external specified real/reactive power reference ($P_\#$, $Q_\#$). Additional binary signal HP (Hold Power) and EC (Enable Control) are used to adjust ramp-rate limits and/or latch power signals for a constant real/reactive power reference.

The RLO module 504 computes rate limited power signals as (internal) real/reactive power reference signals (PCqr, QCqr). The use of rate limited power signals as (internal) real/reactive power reference signals ($P_{C_{qr}}$, $Q_{C_{qr}}$) ensures that volatile power fluctuations at the POI/PCC 112 are being ignored in the reference ($P_{C_{qr}}$, $Q_{C_{qr}}$) and reduced by the DPF module 502 in the microgrid controller 500. The use of the uncontrolled real/reactive power signals at the POI/PCC 112 to compute those rate limited power signals as (internal) real/reactive power reference signals ($P_{C_{qr}}$, $Q_{C_{qr}}$) ensures that the (internal) real/reactive power reference signals ($P_{C_{qr}}$, $Q_{C_{qr}}$) will be close to the uncontrolled real/reactive power signals at the POI/PCC 112, thereby reducing and minimizing the potential power demand signals (P', Q') for the PSS BIGI inverter 604 to avoid saturation.

As the microgrid controller 500 is controlling the real/reactive power signals ($P_C$, $Q_C$) at the POI/PCC 112, the uncontrolled real/reactive power signals at the POI/PCC become unavailable. The RLO module 500 solves this problem by reconstructing the uncontrolled real/reactive power signals at the POI/PCC 112 via a disturbance estimator, using the same SDPM R(s) as defined earlier in FIG. 5.

Although the RLO module 504 as shown in FIG. 5 does not indicate the use of the demand signals (P', Q') to minimize the number of lines drawn in the figure, the RLO module 504 uses the SDPM 510 R(s) to formulate a disturbance estimator by reconstructing the uncontrolled real/reactive power signals at the POI/PCC 112. It may be observed from FIG. 8 that the RLO module 504 uses the real/reactive power demand signals (P', Q') for the inverter 106 along with the SDPM 510 R(s) to estimate the uncontrolled real/reactive power signals ($P_C$, $Q_C$), which in turn is used to determine the (internal) real/reactive power reference signals ($P_{C_{qr}}$, $Q_{C_{qr}}$) based on rate limited version of the estimated uncontrolled real/reactive power signals ($P_C$, $Q_C$).

In addition, the RLO module 504 allows for the use of externally specified power reference signal ($P_\#$, $Q_\#$) that are added to either the estimated uncontrolled real/reactive power signals ($P_C$, $Q_C$) or the latched value of controlled real/reactive power signals ($P_C$, $Q_C$) at the POI/PCC 112. Latching may be enabled when a user-specified binary Hold Power (HP) is set to true (HP=1), whereas a user-specified binary Enable Control (EC) may be used to turn on/off the controller, subject to slew rate limiters.

To ensure the control algorithm in the DPF module 502 does not drain or overcharge the BESS 104, the microgrid controller 500 also incorporates provisions to adjust the (internal) real power reference signal $P_{C_{qr}}$ on the basis of the State of Charge (SoC) data 112 from the BESS 104 or batteries connected to the inverter 106 used for control. The Charge Monitoring and Control (CMC) module 508 compares the externally specified SoC reference signal $SOC_\#$ with SoC data 120 from the BESS 104 to adjust the real power reference signal $P_{Cqr}$ using a Proportional Integral (PI) control algorithm.

$$Cvwx(s)=Kgvwx+KCvwx/s$$

to ensure the SoC data 120 from the BESS 104 tracks the externally SoC reference signal $SOC_\#$.

The implication of the SoC monitoring and control algorithm implemented in the CMC module 508 is that the (internal) real power reference signal $P_{Cqr}$ may be adjusted up/down, depending on the SoC of the BESS 104. It should be pointed out that SoC adjustments are much slower in dynamics than (real) power adjustment and the adjustment of the real power reference signal $P_{Cqr}$ will be of much lower (control) bandwidth than the power adjustments needed for the decoupling real/reactive power control.

6. SoC-Gated and POI/PCC Power Limitation Via (Real) Power Modulation

Combining the MDPF control algorithm is a true 2×2 multivariable control algorithm $$C(s)=QCCbbcb((ss))CCbccc((ss))U=QDDbbcb((ss))$$
$$DDbccc((ss))U\ QCS0(s)CT0(s)U$$

as stated before with the CMC module 508 control algorithm $$Cvwx(s)=Kgvwx+KCvwx/s$$

ensure the SoC data 120 from the BESS 104 tracks the externally SoC reference signal $SOC_\#$ and any real/reactive power flow ($P_{(}$, $Q_{(}$) pair at the POI terminals does not exceed a specific limit. Such a limit $$P((t) \le Piz\{|qi$$

The limit is particularly important for the real power $P_{(}(t)$ at any given time t during the day and the monthly billing cycle. Ensuring $P_{(}(t) \le P_{iz\{|qi}$ limits the real power demand to $P_{iz\{|qi}$, which is important to note that $$Piz\{|qi=\in max\ P(t)$$

is computed over a monthly billing cycle, so that $P_{(}(t) \le P_{iz\{|qi}$ must be satisfied over each and every billing cycle.

Figure 9:
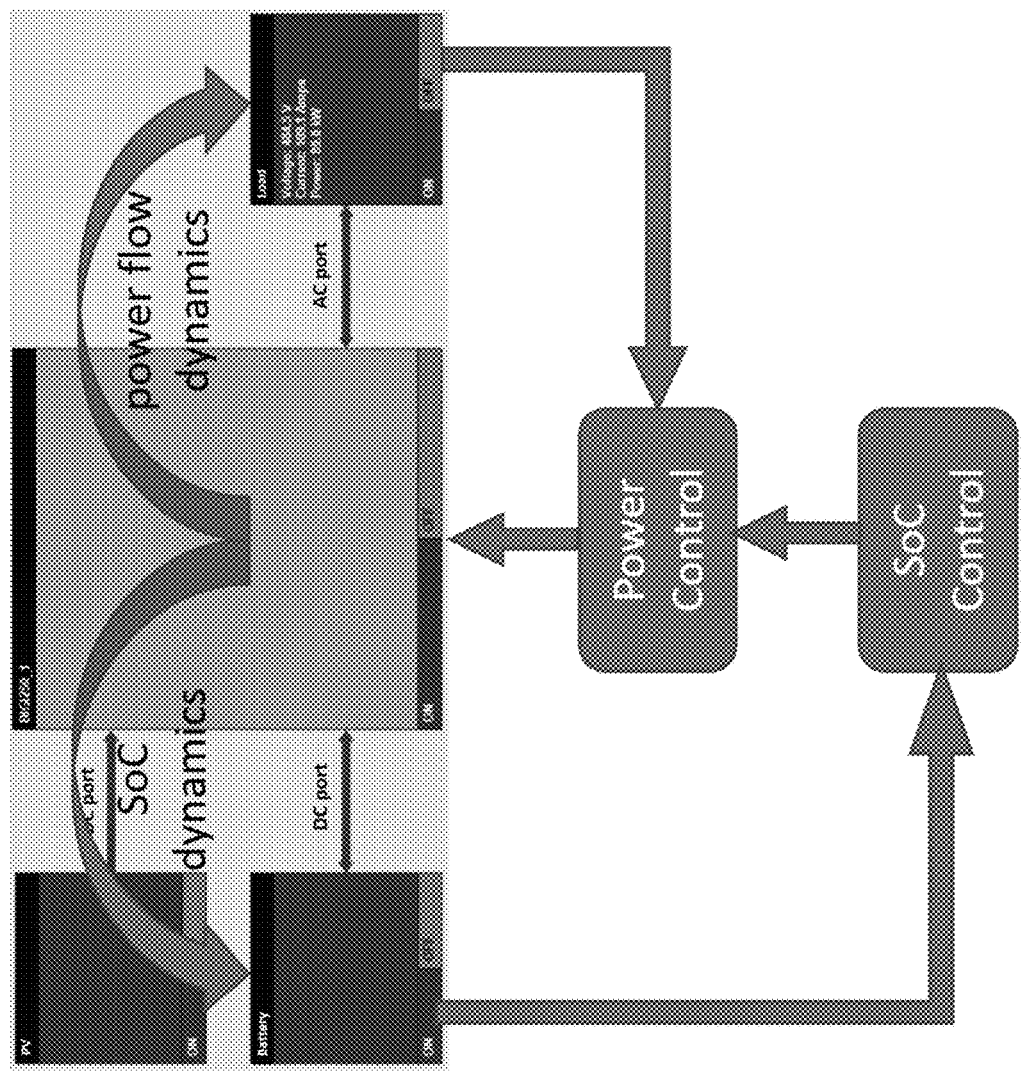
FIG. 9 is an illustration of a microgrid controller for controlling an inverter at the Kaiser Permanente Richmond Medial Center (KPRMC).

The combined MDPF and CMC module 508 control algorithm implemented in the microgrid controller 500 is depicted schematically in FIG. 9. As shown in FIG. 9, the microgrid controller 500 controls the Princeton Power Systems (PPS) BIGI inverter 604 at the KPRMC site by combining both the MDPF control algorithm and the CMC module 508 control algorithm.

B. De-Risking and Testing Procedures of the Microgrid Controller

1. Overview of Power Simulation Model

The proposed microgrid controller with the MDPF control algorithm is tested using real-time controller hardware in the loop (CHIL) simulation by the Nhu Energy, Inc. and Florida State University (FSU) Center for Advanced Power Systems (CAPS) team. Test results of the microgrid control are running at the Synchrophasor Grid Monitoring and Automation (SyGMA) lab at UCSD, communicating in real-time over a secure VPN to the RTDS system at FSU CAPS—demonstrating real time control from east coast to west coast before implementing the microgrid controller at the KPMRC site.

Specifically, the KPRMC electrical system is simulated on a Real-Time Digital Simulator (RTDS) system at FSU-CAPS and the controller is tested by interacting in real-time with the simulated microgrid. The results from the CHIL experiments verify the capabilities of the proposed microgrid controller. For example, the CHIL experiments show decoupling real and reactive power feedback control to maintain an arbitrary specified Thevenin equivalent complex impedance g at the POI of an electric network. The CHIL is primarily used for de-risking and development of controls for planned hardware additions to the KPRMC electrical system including PV and a BESS or batteries.

Figure 10:
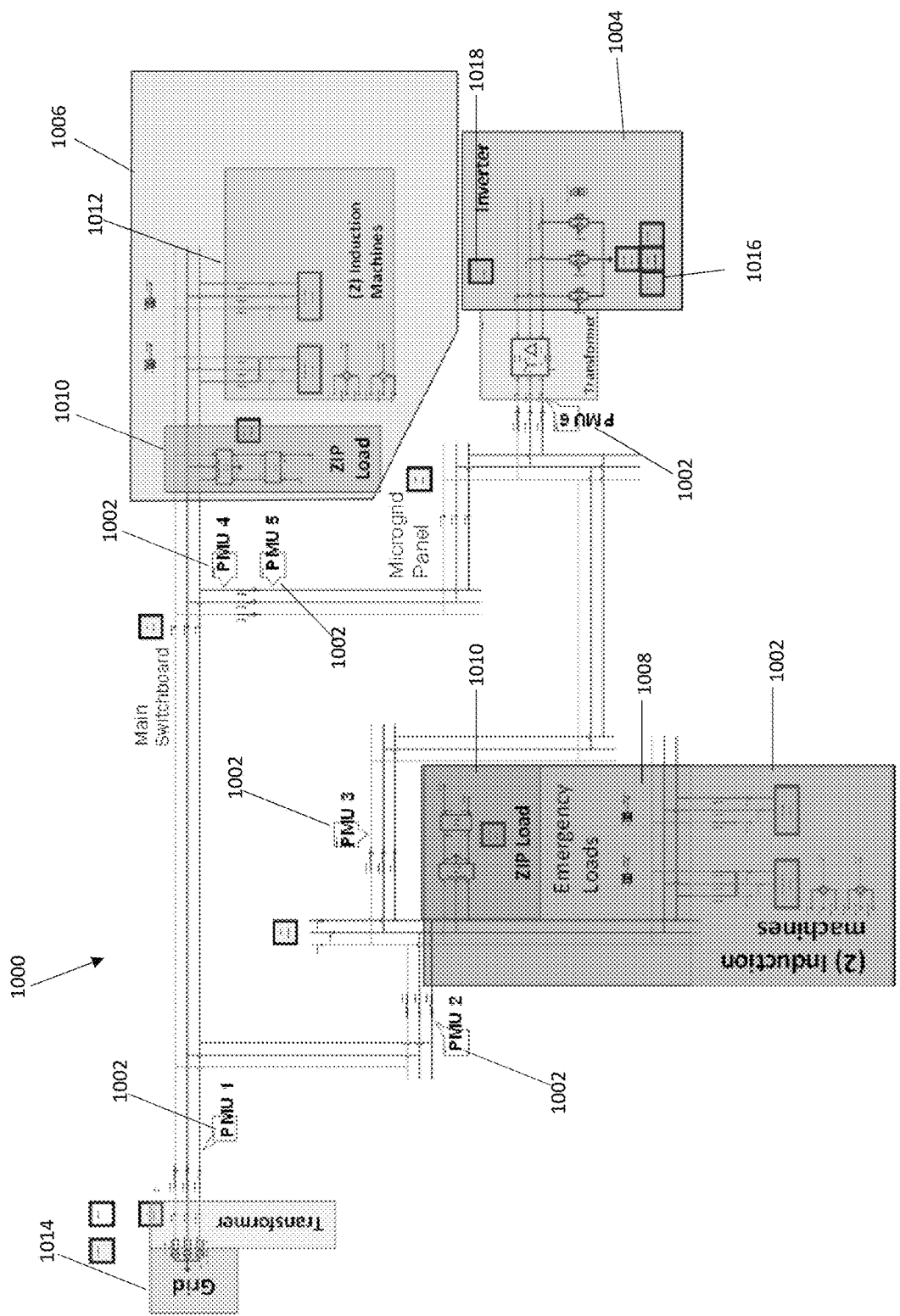
FIG. 10 is a diagram of the modelled microgrid at KPRMC.

FIG. 10 is a high-level illustration of the modelled KPRMC microgrid 1000 in RTDS with Phasor Measurement Units (PMU) 1002 and controllable inverter 1004. The microgrid model 1000 has loads which may be categorized as nonemergency 1006 and emergency 1008. The emergency loads 1008 draw much less power than the non-emergency loads 1006 and may therefore be powered solely by the planned hardware installation. The emergency and non-emergency loads each consist of a constant impedance-current-power (ZIP) load 1010 and two induction machines 1012. The grid interconnection 1014 is modeled using an infinite source and transformer equivalent impedance. The modeled additions to the microgrid 1000 include 6 PMUs 1002, a PV array 1016, an inverter 1004, and a battery 1018. The inverter and battery storage are rated at 250 kW/250 kVar and 250 kW/1 MWh, respectively.

TCP/IP Modbus and C37.118 data communication is implemented in the real-time simulation. The model includes 6 PMUs 1002 that send C37.118 messages providing measurements throughout the microgrid 1000. The C37.118 interface is used to communicate Phasor Measurement Unit (PMU) data which include 3-phase voltage phasors (voltage amplitude and angle), current phasors (current amplitude and angle), and positive sequence 3-phase real and reactive power. PMU 1 is located at the Point of Common Coupling or PCC for observing overall power flow. PMUs 2//3 are located at the AC connection of the Emergency Load (EL) for observing potential EL power flow. PMUs 4/5 are located at the Automatic Transfer Switch, used to emulate the islanding condition of the 250 kW Princeton Power Systems (PPS) Inverter with the emergency loads. PMU 6 is located at the AC connection of the 250 kW Princeton Power Systems (PPS) Inverter for observing PPS power flow.

The simulated inverter 1004 provides a Modbus TCP/IP interface, which is the communication channel for controlling real and reactive power and information including battery SoC and PV power.

The microgrid model 1000 and associated HIL components are used to create various environments for the testing the developed controls. These environments are intended be meaningful representations of the actual system in order to characterize the effect of the controls on the actual system (when deployed). A variety of environments are available and described below to verify and refine the developed control.

1. Parameterized scenarios including peak power demands as seen at the utility interface (POCC). Selected scenario parameters are:
   a. Time of day and demand profile: normal demand patterns, large load pick-up, loss of large load;
   b. Solar PV generation profile; and
2. System under closed-loop control with PMU failures
   a. Data communications
     i. Prolonged network outage intended to simulate an unresponsive device or unplugging a network cable and plugging it back
     ii. Lost packets
     iii. Packets delayed
     iv. iv. Packets reordered
   b. Sensor anomalies intended to represent malfunctioning (or poor-quality sensors).

c. Measurements from voltage and current sensors are modified (e.g., 2% of actual value).

3. System under closed loop control with either failure of the inverter to respond to control commands or saturation of the inverter P or Q at high or low limits.

a. Prolonged network outage intended to simulate an unresponsive device or a unplugging a network cable and plugging it back b. Unresponsive commands
        i. Active Power (input)
        ii. Reactive Power (input)
    c. Incorrect information
        i. Battery state of charge (output)
        ii. PV power generation (output)

2. Overview of Controller Hardware-in-the-Loop Testing

The Controller Hardware-in-the-Loop (CHIL) setup includes the real-time simulated microgrid (also referred to as virtual microgrid), controller, field measurements, and interfacing (controller, simulation, sensing, and converter). The controls developed by and operated at the UCSD are remotely interfaced to the real-time simulated model of the KPRMC microgrid 1000 to test operational and performance characteristics. The major benefit of the CHIL-based testing of the microgrid controls is the possibility to reduce the risks involved in deploying new means of controlling and operating distributed energy resources. The developed controls may be evaluated for stability and performance before installation and operation within the actual system.

Figure 11:
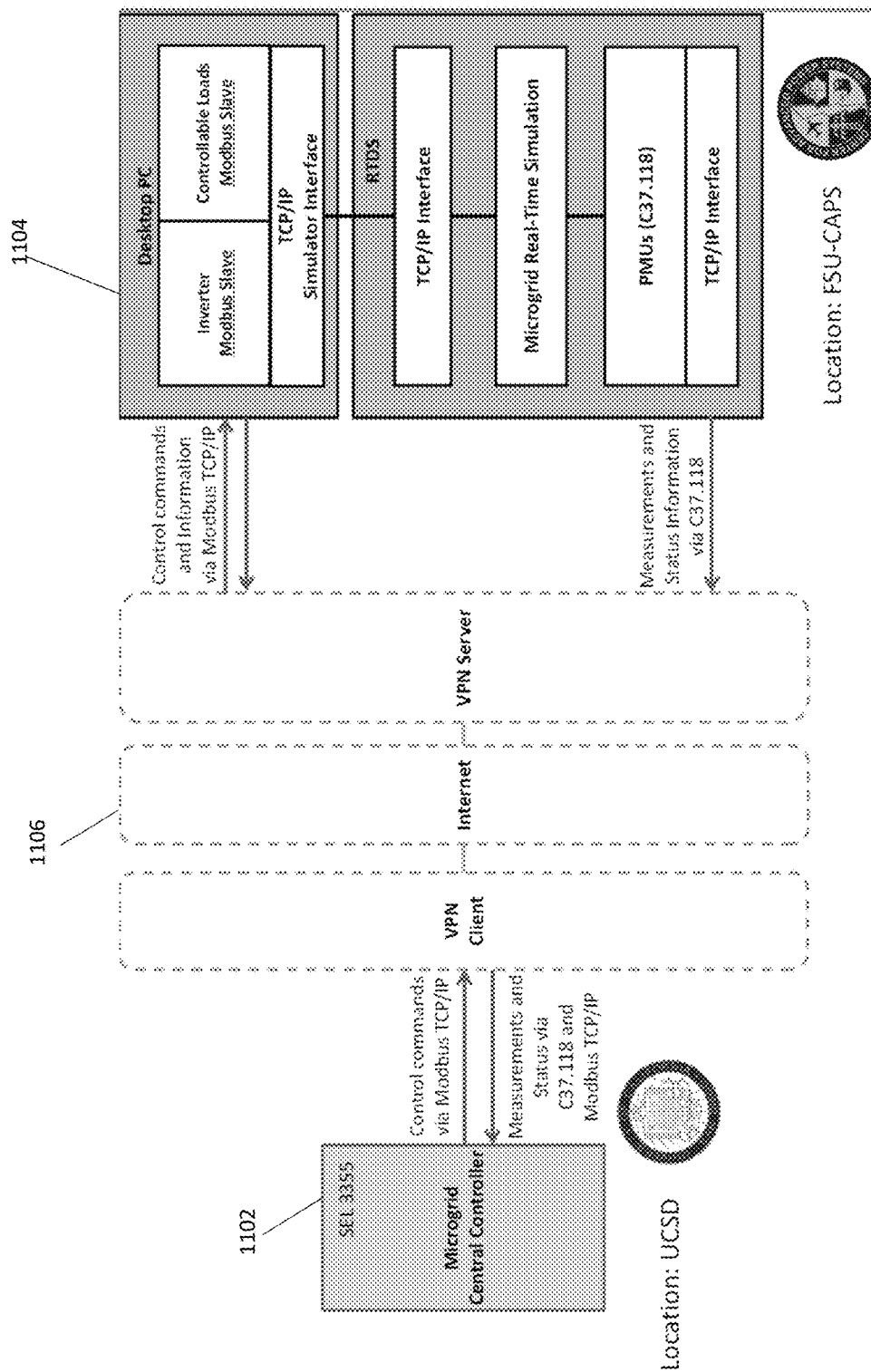
FIG. 11 is a diagram of a communication setup for CHIL testbed in communication with a microgrid controller and a microgrid simulator.

FIG. 11 illustrates a communication setup of the CHIL testbed 1000 with a microgrid controller 1102 located at UCSD and a microgrid simulator 1104 at FSU-CAPS communicating in real-time over the Internet. The microgrid control algorithm (controller) 1102 communicates with the CHIL testbed over a virtual private network (VPN) 1106. The VPN provides an interface that allows the controller 1102, PMUs 1002, and inverter 1004 to communicate with the illusion of being on the same local data communications network. Simulation data from the CHIL testbed is communicated to the controller 1102 via TCP/IP at the rate of 10 Hz. The communicated data items are shown in Table 1 below. PMU communication adheres to the IEEE C37.118 standard, which is the common IEEE standard for PMUs in power systems and inverter communication follows the Modbus TCP/IP protocol.

TABLE I

COMMUNICATED DATA IN THE CONTROLLER HIL TEST SETUP

| Data | From | To | Comm. Protocol |
| --- | --- | --- | --- |
| Active and reactive power at 6 points | PMUs 1-6 | Controller | IEEE C37.118 |
| Voltage, current, and frequency at 6 points | PMUs 1-6 | Controller | IEEE C37.118 |
| Battery SoC | Inverter | Controller | Modbus |
| PV Generation | Inverter | Controller | Modbus |
| Inverter active and reactive power reference | Controller | Inverter | Modbus |

3. The Open-Loop Test Results

The first test that is performed is "open-loop" or "uncontrolled" microgrid test to estimate the dynamics of individual rational transfer function models for deriving the Simplified Dynamic Power Model (SDPM) 510 R(s) indicated earlier in FIG. 5 and also used in the RLO module 504 of FIG. 8. The transfer functions in the SDPM 510 R(s) are estimated by performing experiments on the (virtual) microgrid and collecting time domain data the real/reactive (P', Q') power demand signals for the inverter 1004 and the real/reactive ($P_G$, $Q_G$) power flow pair at the POI/PCC 1014. The time domain data of "input" (P', Q') and "output" ($P_G$, $Q_G$) signals are used to estimate the parameters of the numerator and denominator coefficients of the rational transfer function models in either continuous- or discrete-time. For the parameter estimation, the step response-based realization methods developed at UCSD or Prediction Error Minimization (PEM) methods developed by Ljung (1999) are used.

The open-loop test consists of small step input signals to both the real and reactive power reference signals of the inverter 1004. The periodicity of the signals is chosen such that power may settle within each real or reactive power step applied to the (Virtual) microgrid 1000. For performing the test, input/output (IO) modules are developed with the following functionality: 1) a C37.118 read interface is developed to run under Matlab Simulink to gather experimental data set by PMUs 1002 in the microgrid; and 2) a Modbus master/slave interface is developed to run under Matlab Simulink to send power reference signals to user-specified Modbus registers over TCP/IP.

Real-time measurements of both real- and reactive power flows provided by the PMUs 1002 are used to formulate the dynamic model R(s) and used to tune and test the feedback controller on the Simplified Dynamic Power Model (SDPM) 510 R(s).

The control signals use the Modbus TCP/IP protocol to send active and reactive power reference commands to the simulated inverter 1004. The PPS BIGI inverter accepts 604 real/reactive power demand signals (P', Q') at a rate of only 1 sample/second with an additional delay of 1 second. The simulated inverter 1004 of the virtual microgrid model 1000 may accept fast update rates of 10 samples/second over the internet to FSU-CAPS (east coast) from the SyGMA lab at UCSD (west coast). The maximum rate of real/reactive power demand signals (P', Q') is primarily limited by the speed of the network connection between FSU and UCSD.

Figure 12:
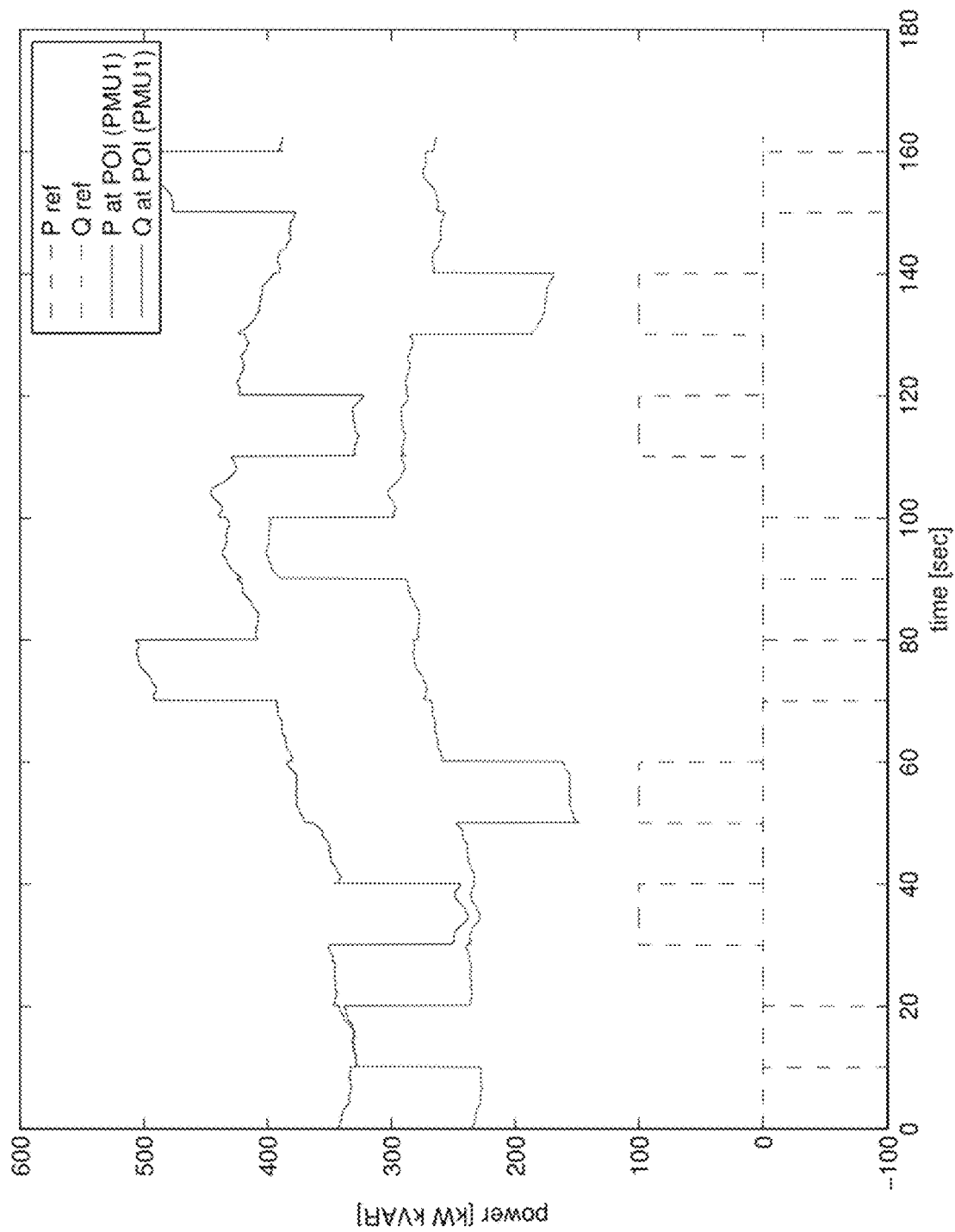
FIG. 12 is a chart illustrating real and reactive power flow output signals due to real and reactive flow input demand signals at a POI.

FIG. 12 illustrates open-loop test data, measuring real and reactive power flow ($P_G$, $Q_G$) "output" signals (solid lines) due to real and reactive power flow "input" (P', Q') demand signals (dashed lines) at the POI. It may be observed from the open-loop test data that real and reactive power $JP_G$, $Q_GK$ at the POI changes due to real and reactive (P', Q') demand signals, but also (small) coupling may be observed in the $JP_G$, $Q_GK$ signals. Furthermore, the RTDS simulation shows (uncontrolled) large variations of the real and reactive power $JP_G$, $Q_GK$ at the POI causing real and reactive power control to drift and change. The control algorithm of the microgrid controller 1102 aims to reduce these power fluctuations. As a final note, it should be observed that the simulation model has not been fully validated against high resolution data from the actual KPRMC microgrid 1000, but the approach illustrates that dynamics and coupling between real and reactive power $JP_G$, $Q_GK$ at the POI may be modelled with step-based changes on the real and reactive (P', Q') demand signals that may be replicated on the actual KPRMC microgrid.

4. Closed-Loop Test: Externally Specified Real Power Reference

Figure 13:
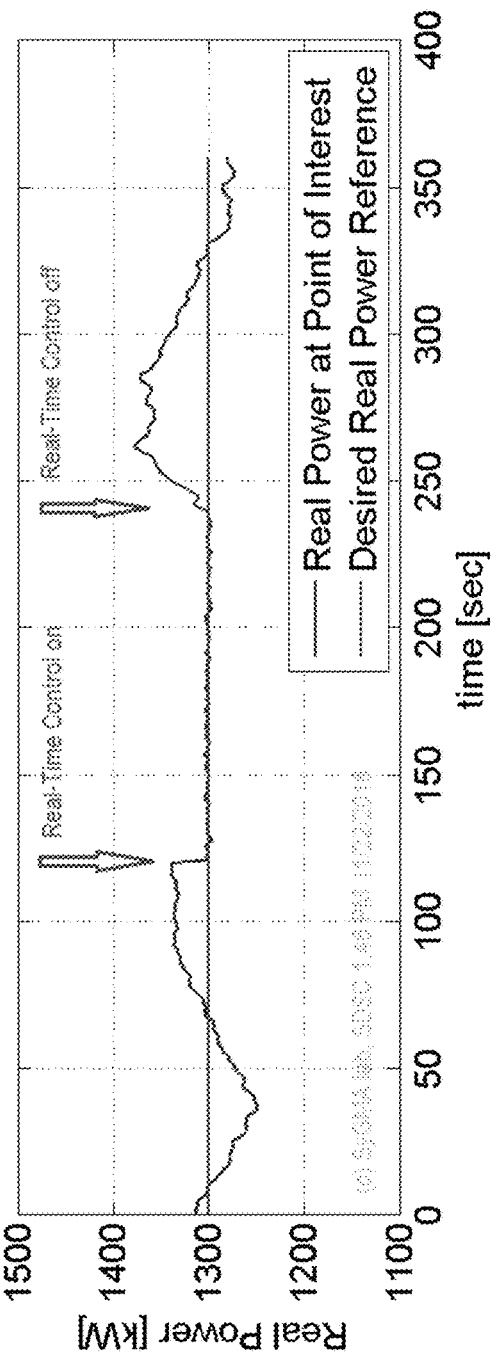
FIG. 13 are charts illustrating real power demand levels within the modelled microgrid.
Figure 13:
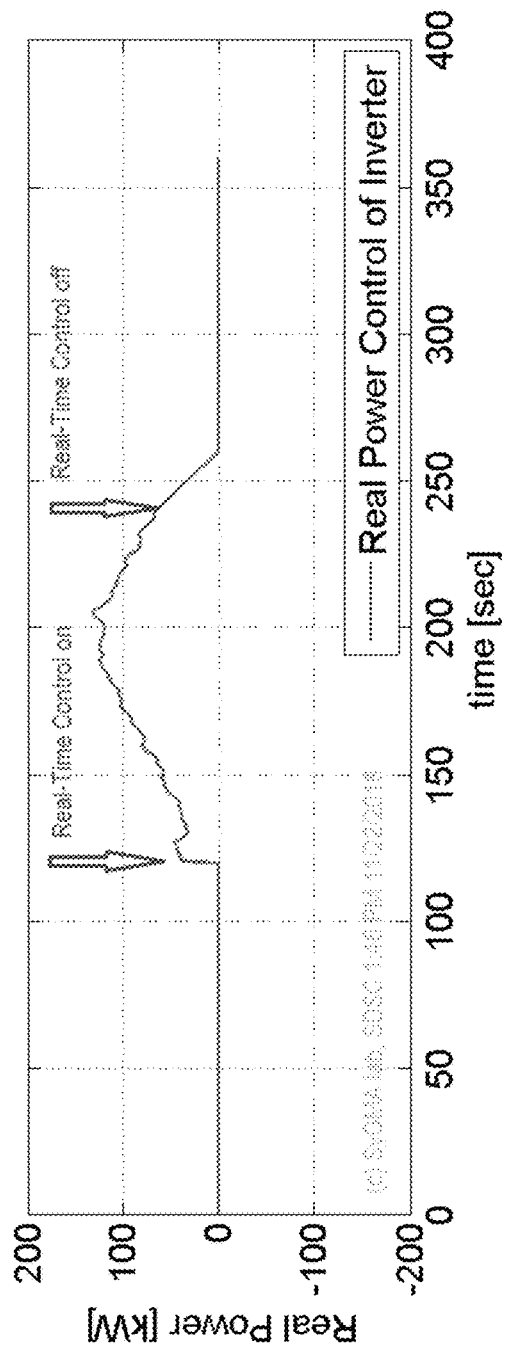

Based on the "open-loop" test data, an open-loop model of the (coupling) power flow in the microgrid model 1000 simulated by the RTDS. The model was used to formulate a decoupling filter D(s) as described above and tune the PID controllers $C_S(s)$ and $C_T(s)$ for real/reactive power flow control and tracking. The results of tracking an externally specified real power flow reference $P_\#$ over a short time interval (2 minutes) is depicted in FIG. 13. FIG. 13 is a demonstration of real power tracking, where an Independent System Operator (CAISO) externally specified real power reference signal of 1.3 MW (indicated by hashed-lines) is followed (tracked) for 2 minutes. In this test only the real power is subjected to a fixed reference signal, while reactive power is allowed to change.

When the control is started, the real power demand of the inverter 1004 jumps up bounded by rate constraints. When the control is stopped, the SOS module 508 forces the control to ramp down to zero subject to its regular ramp rate limitation and demonstrating a safe controller shutdown. The results depicted in FIG. 13 show the powerful effects of the microgrid controller 1102: the real power may be held at a user-specified value for a short time, only dependent on the available SoC of the battery. It should be pointed out that these results were obtained by running the RTDS (Virtual Grid) model at FSU (east coast), while running the control algorithm at the SyGMA lab at UCSD (west coast). All this was done at 10 Hz sampling and shows that the controller testing and tuning may be done even over large distances.

5. Closed-Loop Test: Decoupling Real/Reactive Power Control

Figure 14:
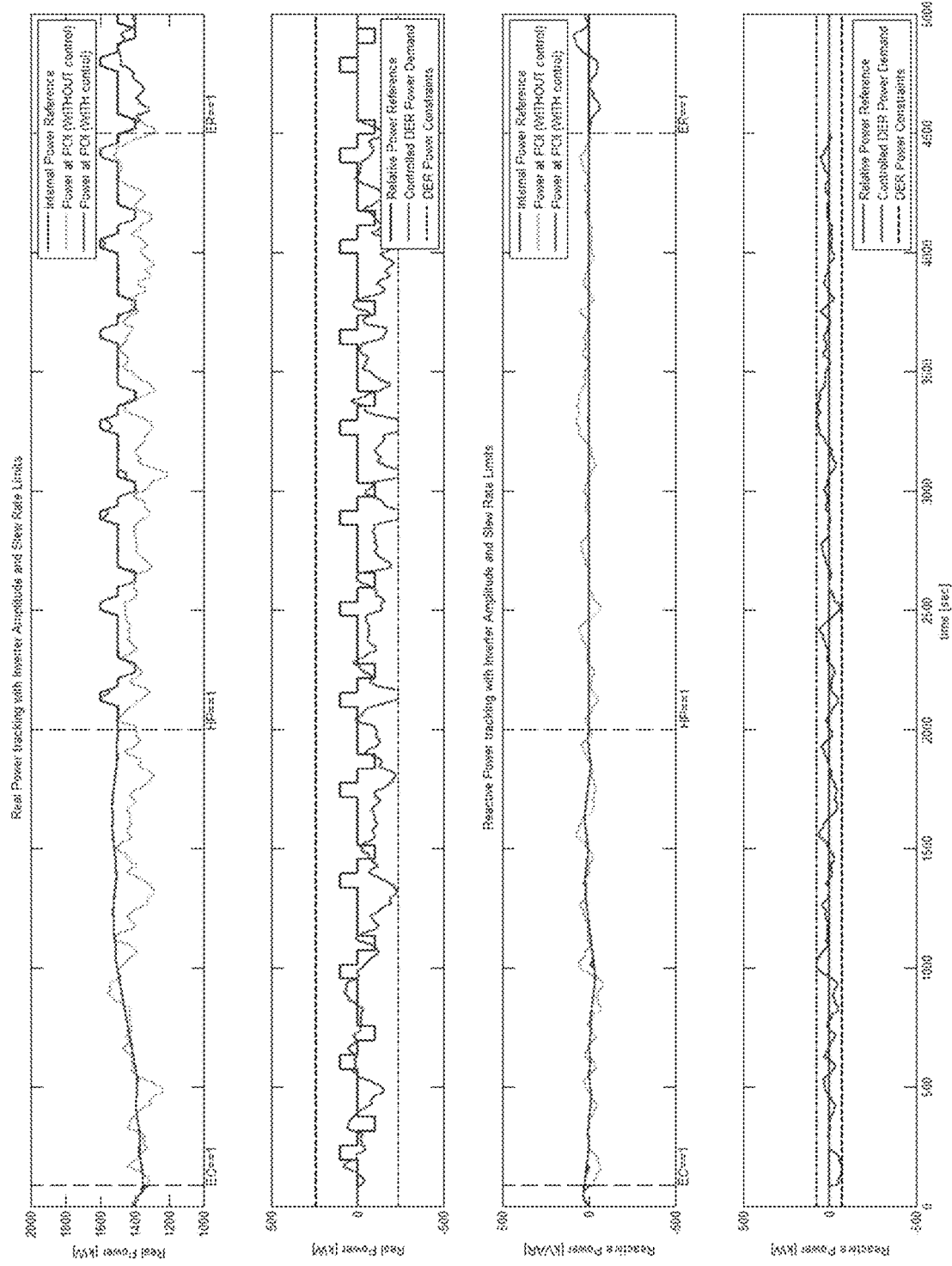
FIG. 14 are charts illustrating decoupled real and reactive power levels within the modelled microgrid.

Demonstration of the independent real/reactive power control capabilities of the microgrid controller is illustrated in FIG. 14. In these experiments an externally specified step-wise changing real power reference signal and a constant reactive power reference signal are used to demonstrate the decoupled real/reactive power tracking capabilities of the microgrid controller 1000. FIG. 14 demonstrates decoupled real and reactive power tracking, where an Independent System Operator (CAISO) externally specified +/−100 kW step-wise changing real power reference signal and a constant reactive power reference signal are followed (tracked) whenever the binary signal Hold Power (HP) is set to true (HP=1). The control is started when Enable Control (EC) is set to true (EC=1), starting the microgrid controller in the autonomous ramp rate mode. The control is stopped when Enable Ramp (ER) is set to true (ER=1), where the SOS module forces the control to ramp down to zero subject to its regular ramp rate limitation and demonstrating a safe controller shutdown.

The independent real/reactive power control capabilities of the microgrid controller illustrated in FIG. 14 demonstrate the powerful feature of the microgrid controller 1102: to be able to follow or track real and reactive power demands at the POI/PCC independently. Although these features are important for a microgrid, the ability to independently track real and reactive power is limited by the inverter (actuator) saturation, but also by the amount of energy available. As such, it is important to also maintain and control the SoC of the BESS 1018 to be able to maintain the control authority to track and regulate real power.

Figure 15:
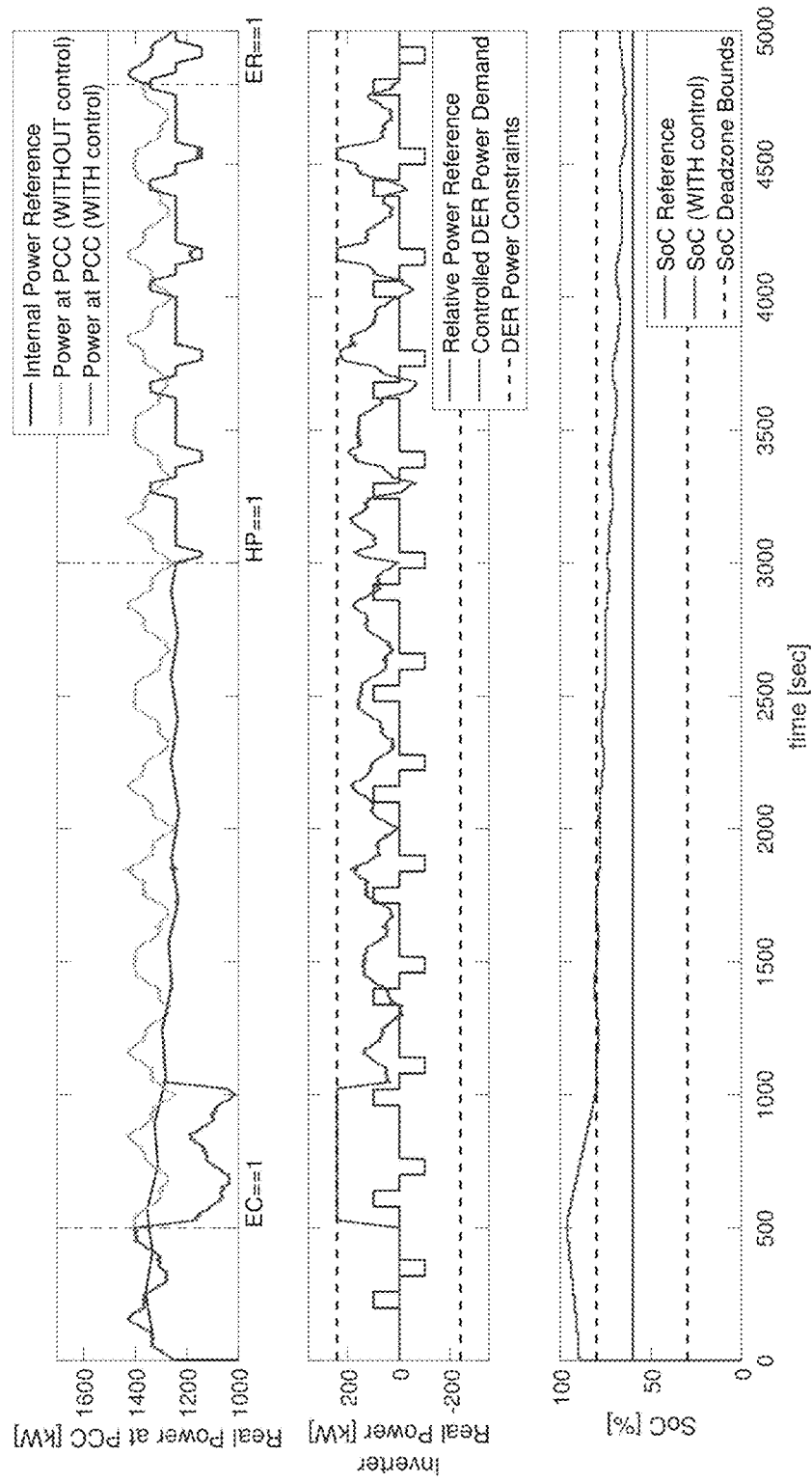
FIG. 15 are charts illustrating (decoupled) real power levels within the modelled microgrid.

The capabilities to be able to follow or track real and reactive power demands at the POI/PCC independently despite a large discrepancy in the SoC of the BESS 1018 is illustrated in FIG. 15. FIG. 15 demonstrates (decoupled) real power tracking, where an Independent System Operator (CAISO) externally specified +/−100 kW step-wise changing real power reference signal and the BESS 1018 started out at a 80% SoC with large (real) power fluctuations at the PCC/POI of the microgrid 1000. In these experiments the BESS 104 started out with a relatively large SoC level of almost 80%, whereas significant real/reactive power fluctuations at the POI/PCC were present due to periodic load switching in the microgrid 1000.

Similar to the results shown in FIG. 14, the power reference signal is followed (tracked) in FIG. 15, whenever the binary signal Hold Power (HP) is set to true (HP=1). The control is started when Enable Control (EC) is set to true (EC=1), starting the microgrid controller in the autonomous ramp rate mode. The control is stopped when Enable Ramp (ER) is set to true (ER=1), where the SOS module 508 forces the control to ramp down to zero subject to its regular ramp rate limitation and demonstrating a safe controller shutdown.

The results in FIG. 15 indicate the adjustments the microgrid controller 1102 makes to the real power to ensure the BESS 1018 will not be over-charged. As observed in the SoC plot (bottom plot in FIG. 15), the starting SoC of the battery 1018 is set outside the dead zone band for test purposes. The controller 1100 is activated at 500s from when it is commanded to operate in the autonomous rate limited mode (or also called adaptive reference mode). However, by this time, since the SoC has already grown largely out of limits and passed its absolute limits, the only priority of the control system becomes SoC recovery until it reaches the safe zone. This is done by operating the inverter 1004 in the full power mode (subject to ramp rate limitation) and continues until SoC reaches safe zone at around 1000 s. Afterwards, the controller 1102 switches back to adaptive reference mode and the power measured at POI/PCC is able to follow the reference. The reference computed by the adaptive reference computation module is shown by blue in the top figure. This scenario continues until time 3000~. The inverter's 1004 control input during this period is shown by red in the middle figure and falls within the inverter's power limits. At time 3000 s, the controller 1102 is switched from adaptive to manual reference mode, where the controller is able to follow a modulating trapezoidal reference set by the user. The bottom plot shows that the SoC is within acceptable limits after time 1000 s. As observed in middle plot of FIG. 15, the inverter's 1004 control input is barely reaching its limits after time 1000 s, which means the reference variations are within the inverter's power control capability. The controller 1102 is finally switched off at 4800 s.

7. Closed-Loop Tests: Dynamic Load Switching

Although very good results have been obtained by the CHIL using the microgrid controller 1102 to track real/reactive power reference signals, a final test was performed with dynamic load switching. The dynamic load switching demonstrates the capabilities of the microgrid controller to reduce power flow disturbances at the POI/PCC caused by (fast) dynamic load changes. The results are illustrated in FIG. 16 which demonstrates (decoupled) real power disturbance rejection, where real power fluctuations at the POI/PCC are generated by (periodic) on/off switching of fast dynamic loads in the microgrid 1000.

Figure 16:
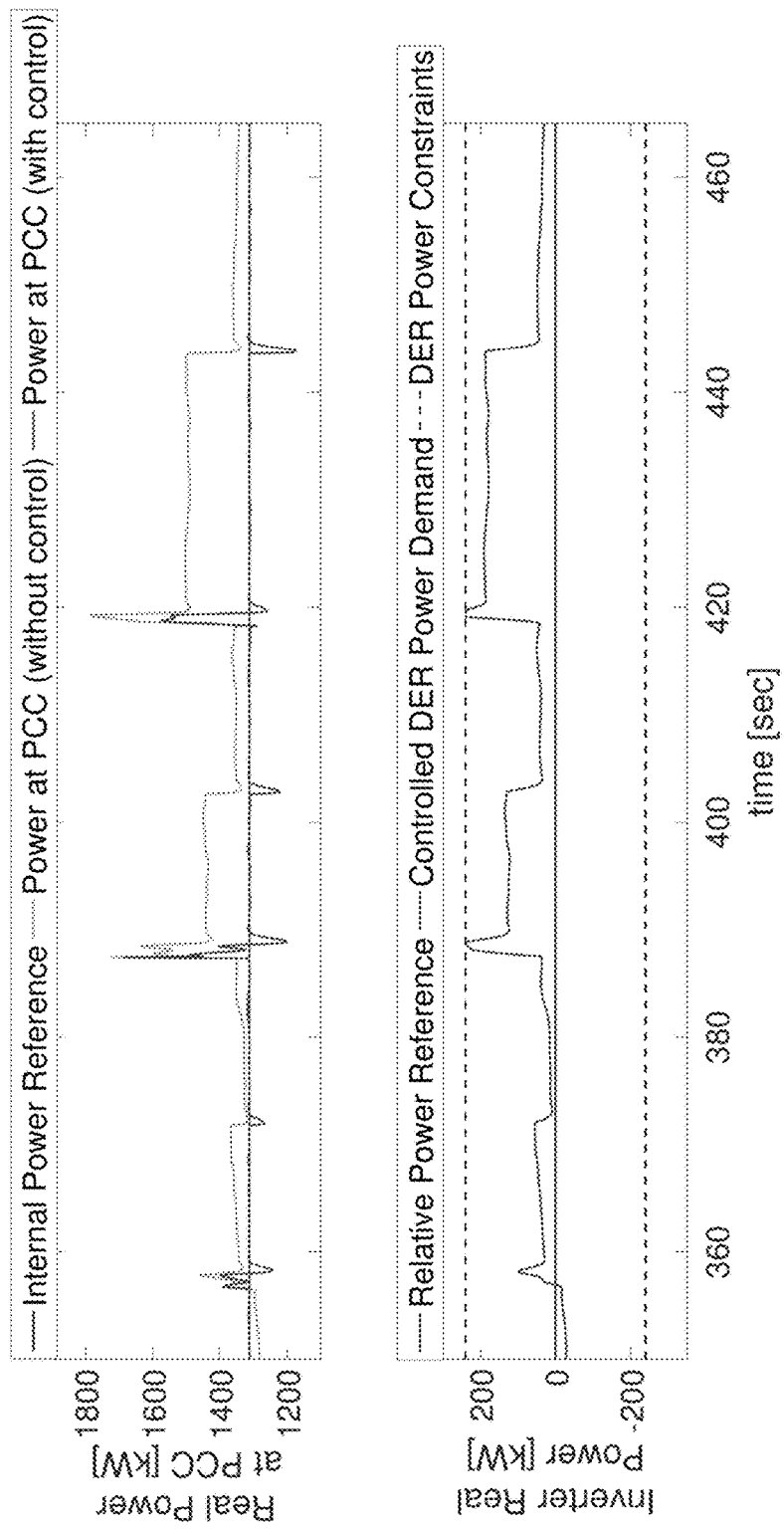
FIG. 16 are charts illustrating (decoupled) real power disturbance rejection within the modelled microgrid.

The test results summarized in FIG. 16 are designed to emulate more transient microgrid events and examine the controller's 1102 ability to continue to perform in the presence of transient power fluctuations. In particular, the test results in FIG. 16 emulate abrupt load switching events and the effect of inverter's 1004 ramp rate limitation and the communication delay on the controller's 1102 ability to control those events. The test scenario comprises the microgrid 1000 with its usual time-varying load demand while an additional 50 kW motor is suddenly switched in. The switch-in event causes POI/PCC real power to experience a sudden jump, however, the controller 1102 should be able to recover the previous POI/PCC power level in a timely manner. After successful recovery, the 50 kW motor is switched off and a 100 kW motor is switched in this time. A similar scenario then happens for a 150 kW motor.

The results will depend on the ramp rate limits of the inverter and to demonstrate the control capabilities of the microgrid controller 1102. FIG. 16 shows controlled power for a relatively fast inverter with ramp rate of 80 kW/s in the presence of a controller delay of one-time step and a communication delay of one-time step (0.1 sec at 10 Hz). The microgrid controller 1102 performs well with the relatively fast inverter 1004 by quickly reducing the power disturbances. This is apparent in both the POI/PCC power plots (top) and inverter power plots (bottom) in FIG. 16. The microgrid controlled inverter 1004 not only corrects the steady state power level but also partly diminishes the effects of fast power transients that occur during the load switching (apparent in the instantaneous spikes after each event.

Figure 17:
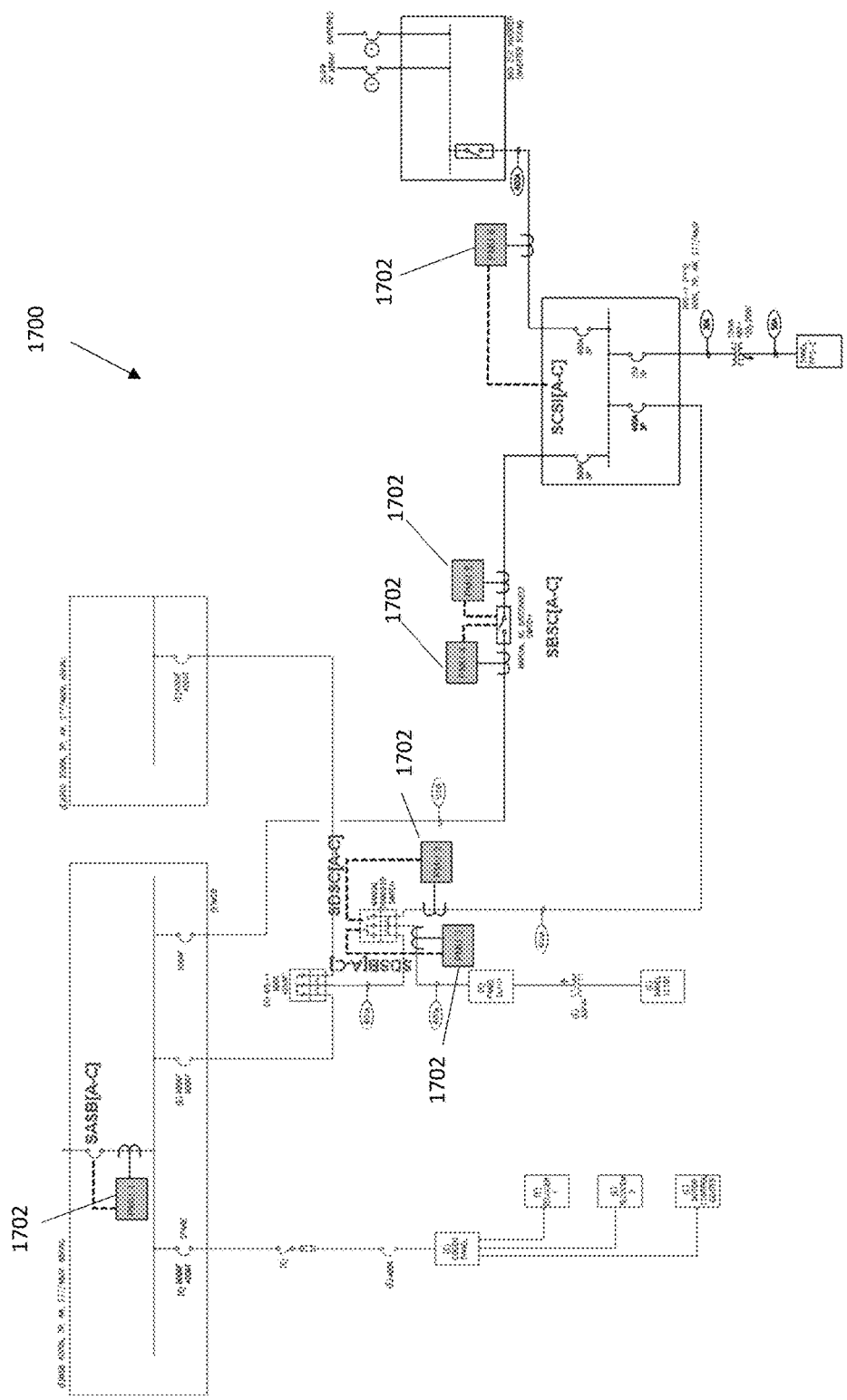
FIG. 17 is a one-line diagram illustrating the KPRMC microgrid.

C. Implementation of Microgrid Controller and Validation of PMU Data Using SEL Equipment 1. PMU Locations To be able to implement the developed microgrid controller on the actual microgrid of the KPRMC site, the infrastructure to measure synchrophasor data, import data into a control computer and send control signals to the PPS BIGI inverter needs to be developed. FIG. 17 is a one-line diagram of the KPRMC site microgrid 1700 showing the PMU 1702 locations. It is clear from FIG. 17 that the PMUs 1702 are located at strategic locations in the microgrid 1700 and coincide with PMU 1002 locations used in the RTDS model used to simulate the virtual microgrid 1000. The PPS BIGI inverter is shown at 1706, the battery system at 1708, and the PV array at 1710.

2. SEL-Based Synchrophasor Platform

Synchrophasor data at the 6 different PMU 1702 locations in the KPRMC microgrid 1700 indicated in FIG. 17 are being realized by SEL-2240 Axion based system, whereas computing power for the controller 1704 is based on the rack-mounted rugged SEL-3355 computer. An overview of the SEL hardware installed in the KPRMC microgrid 1700 is illustrated in FIG. 18.

The SEL-2240 Axion is a fully integrated, modular input/output (I/O) and control solution that combines the communications, built-in security, and IEC 61131 logic engine of the SEL RealTime Automation Controller (RTAC) family with a durable suite of I/O modules that provide highspeed, deterministic control performance over an EtherCAT network. Inside the SEL-2240 Axion, the SEL-2241 RTAC Module operates as the CPU for an SEL-2240 Axion Platform. The SEL2241 RTAC Module interfaces seamlessly with the I/O Modules used to implement the PMU capabilities on the SEL-2240 Axiom platform.

Figure 18:
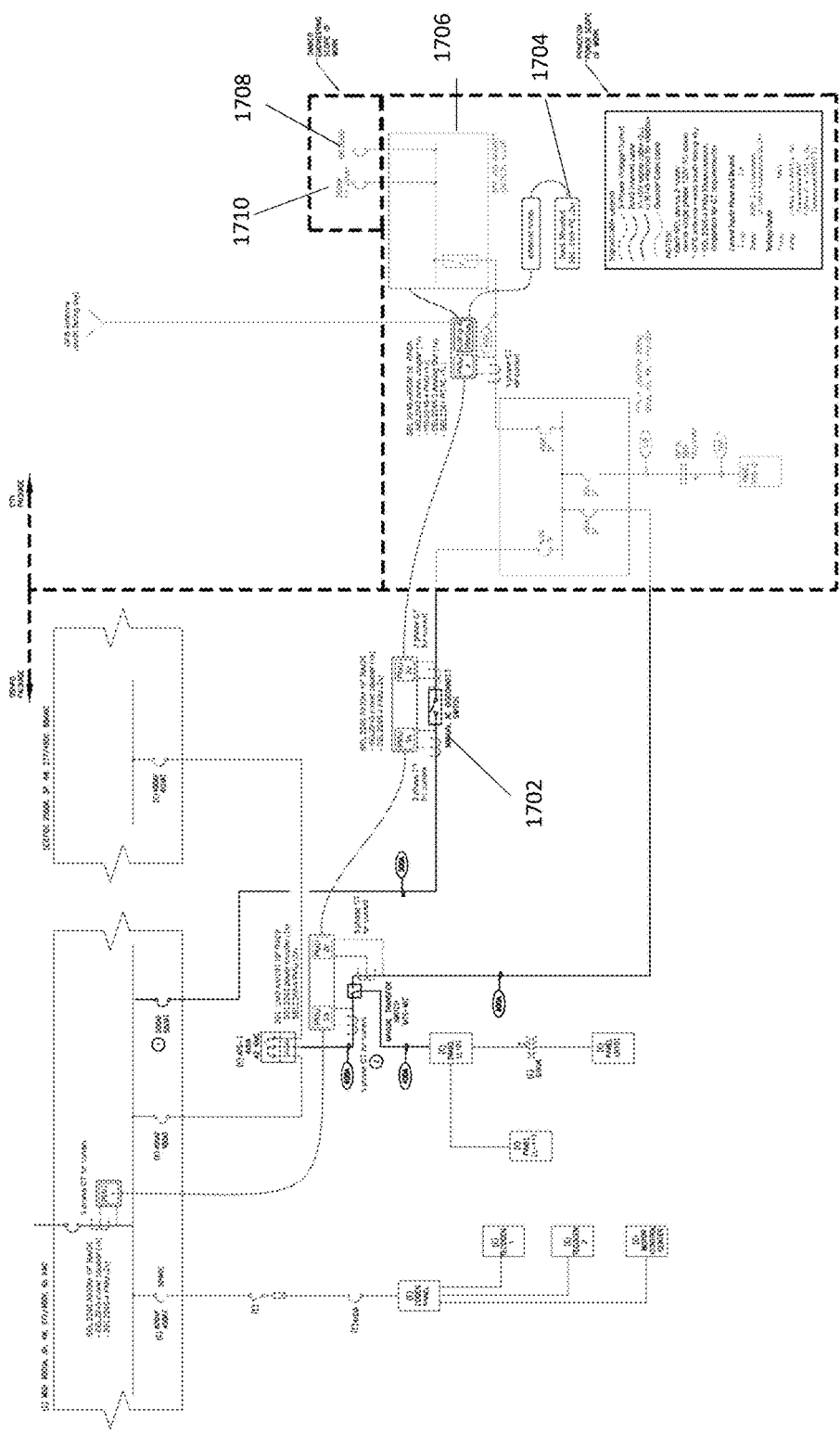
FIG. 18 is a diagram illustrating hardware setup for the cyber-secure synchrophasor platform at the KPRMC microgrid.

As indicated in FIG. 18, the PMU capabilities for the SEL-2240 Axiom platform is provided by the SEL-2245-4 Metering Module that provides a 4CT/4PT metering capabilities. Together with the SEL-2241 RTAC Module, they provide an IEEE Certified PMU device, capable of sending IEEE C37.118 communication over TCP/IP at 60 samples/second. To power both the SEL-2241 RTAC Module and the SEL-2245-4 Metering Module, the SEL-2240 Axiom platform also needs an SEL2243 power coupler. To accommodate analog signal communications to the PPS BIGI inverter 1706, one of the SEL-2240 Axiom platforms is also equipped with a SEL-2245-3 Analog Output Module. It allows the generation of analog voltage or current (4-20 mA) control signals to be sent to an inverter 1706.

PMU data and control commands are processed by a separate Rack-Mount Rugged SEL Computer: the SEL-3355. Designed as a server-class computer, the SEL-3355 computer is built to withstand harsh environments in utility substations and industrial control and automation systems. By eliminating all moving parts, including rotating hard drives and fans, and using error-correcting code (ECC) memory technology, the SEL-3355 has over ten times the mean time between failures (MTBF) of typical industrial computers.

To enable a cyber secure network, all SEL hardware is copper wired onto firewall protected local network. The SEL 2240 hardware (PMUs and analog output) are all daisy chained on the same Local Area Network and connected only to the SEL-3355 computer. For hardware redundancy, two SEL-3355 computers are configured in a High Availability (HA) mode to allow independent (security) patching of each SEL-3355, while allowing the microgrid controller 1704 to run uninterruptedly.

3. Configuration of the SEL Synchrophasor Platform

The SEL equipment for the KPRMC microgrid 1700 comes in 4 chassis (called SEL-2240) and 1 computer (called SEL-3355). The different chassis have the modules described herein. Each chassis always has a "power coupler" module (called SEL-2243) that requires 110/240 VAC to power the chassis. 3 out of 4 of the chassis have a "Digital Output" module (called SEL-2244). 1 out of 4 of the chassis has a "Analog Output" module (called SEL-2245-3). 1 out of 4 of the chassis has a "RTAC" module (called SEL-2241). Each chassis has at least 1 (or sometimes 2) "4CT/4PT" module (called SEL-2245-4) that requires 3 phase voltage, 3-phase current and (optional) neutral voltage/current signals.

Figure 19:
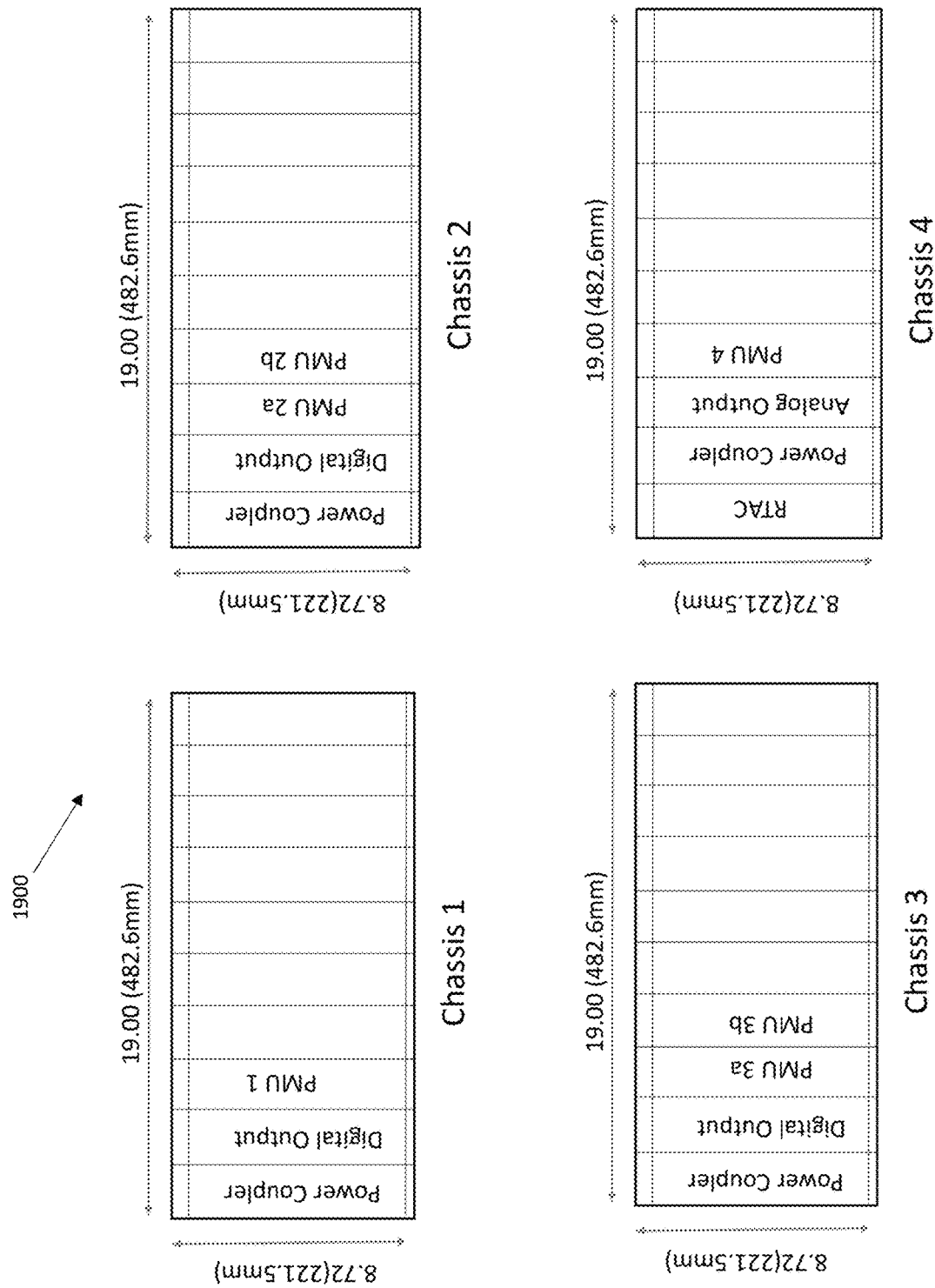
FIG. 19 are diagrams illustrating hardware equipment chassis configurations for the KPRMC microgrid.

In the setup for the microgrid 1700 of the KPRMC site, a total of 6 "4CT/4PT" modules (or PMUs) distributed over the 4 chassis and each "4CT/4PT" module is configured to act as the actual Phasor Measurement Unit (PMU) measuring synchronized power flow at different locations in the KPRMC microgrid 1700. The "Power Coupler". "Digital Output", "Analog Output" and "PMU or 4CT/4PT" modules are distributed over the 4 chassis according to chassis configuration 1900 as illustrated in FIG. 19.

Each "4CT/4PT or PMU" module (called SEL-2245-4) requires 3 phase voltage, 3-phase current and (optional) neutral voltage/current signals for actual measurement of phasors and frequency so that 3 phase power flow may be calculated. The SEL-2245-4 measurement range for voltage is

VNOM: 300 V

Measurement Range: 5-400V L-N, 9-693 L-L Vac

Fundamental/RMS (UL): 5-300V L-N, 9-520V L-L Vac

Maximum: 600 L-N, 1039 L-L Vac Fundamental/RMS for 10 s

The SEL-2245-4 measurement range for current is:

INOM: 1 A or 5 A (no settings required)

Measurement Range: 0.050-22 A Continuous, 22-100 A Symmetrical for 25 s

Scaling may be adjusted in software in case measured voltage/current is adjusted via CT and PT devices.

4. Validation of Power Data

The Princeton Power System (PPS) includes the Energy Management Operating System (EMOS), the BIGI system with the inverter 1706 and battery charging systems 1708. The external microgrid controller 1704 or "microgrid controller" interfaces with the EMOS via Modbus communication to both measure SCADA data (related to Solar Power Production and Battery State of Charge) and provide external power demand signals. The external microgrid controller 1704 processes the PMU measurements generated by the SEL equipment to compute the desired external power demand signal for the EMOS.

A comprehensive tag list for both the PMU data produced by the SEL equipment, the SCADA data produced by the PPS and the power demand signals to the EMOS is used to map measurements to databased entries in the OSIsoft PI system. The same mapping is also used in the microgrid controller 1704 to compute the control signals and both PMU data using C37.118 protocol and SCADA, control signals via the Modbus Function 23 (read/write) protocol are implemented over TCP/IP. The communication of both C37.118 and Modbus over TCP/IP allows a controller configuration to be implemented on the SEL3355 (main SEL control computer) that only requires a standard TCP/IP stack for both data gathering and sending power demand commands to the EMOS.

Figure 20:
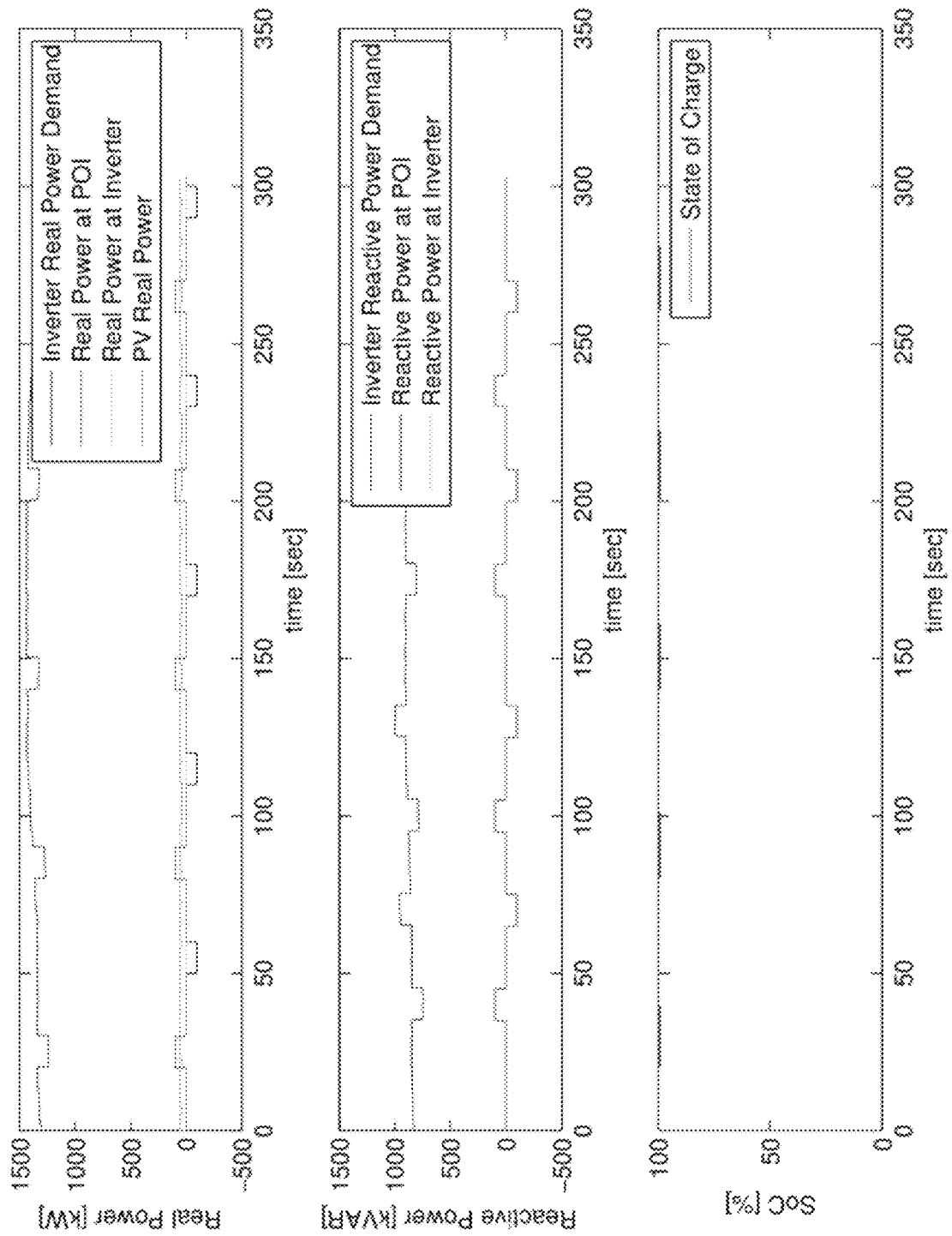
FIG. 20 are charts illustrating real time measurements from selected PMU's within the KPRMC microgrid.

The mapping of the I/O signals of the controller 1704 has been tested extensively with the RTDS system running the KPRMC microgrid model. The validation test results show successful monitoring of both the PCC/POI PMU, the inverter PMU and the inverter Modbus register (read/write) reproduce power data that is consistent with the models as illustrated in FIG. 20. FIG. 20 shows real-time measurements of PCC PMU (PMU1, C37.118), inverter PMU (PMU4, C37.118), Solar Power (PV, Modbus register) and State of Charge (SoC, Modbus Register) obtained via communication to RTDS at FSU while updating the real and reactive power demand signals to the PPS inverter 1706. The results show how SoC has reached a maximum value, limiting negative real power demand signal.

With the inverter 1706 and battery system 1708 properly installed and the SEL hardware with the PMUs 1702 reliably collecting phasor data 60 times a second, a simple inverter step response was carried out at KPRMC site. The inverter steps response was carried out by sending a 50 kW real power demand response to the inverter 1706, while the PMUs 1702 were collecting the measurements of power flow. Such a step response may be used to model slew rate, latency and dynamic settling of the power flow at the PCC at the KPRMC site. A summary of the test results and the modeling efforts to characterize the dynamic behavior of the power flow is illustrated in FIG. 21.

Figure 21:
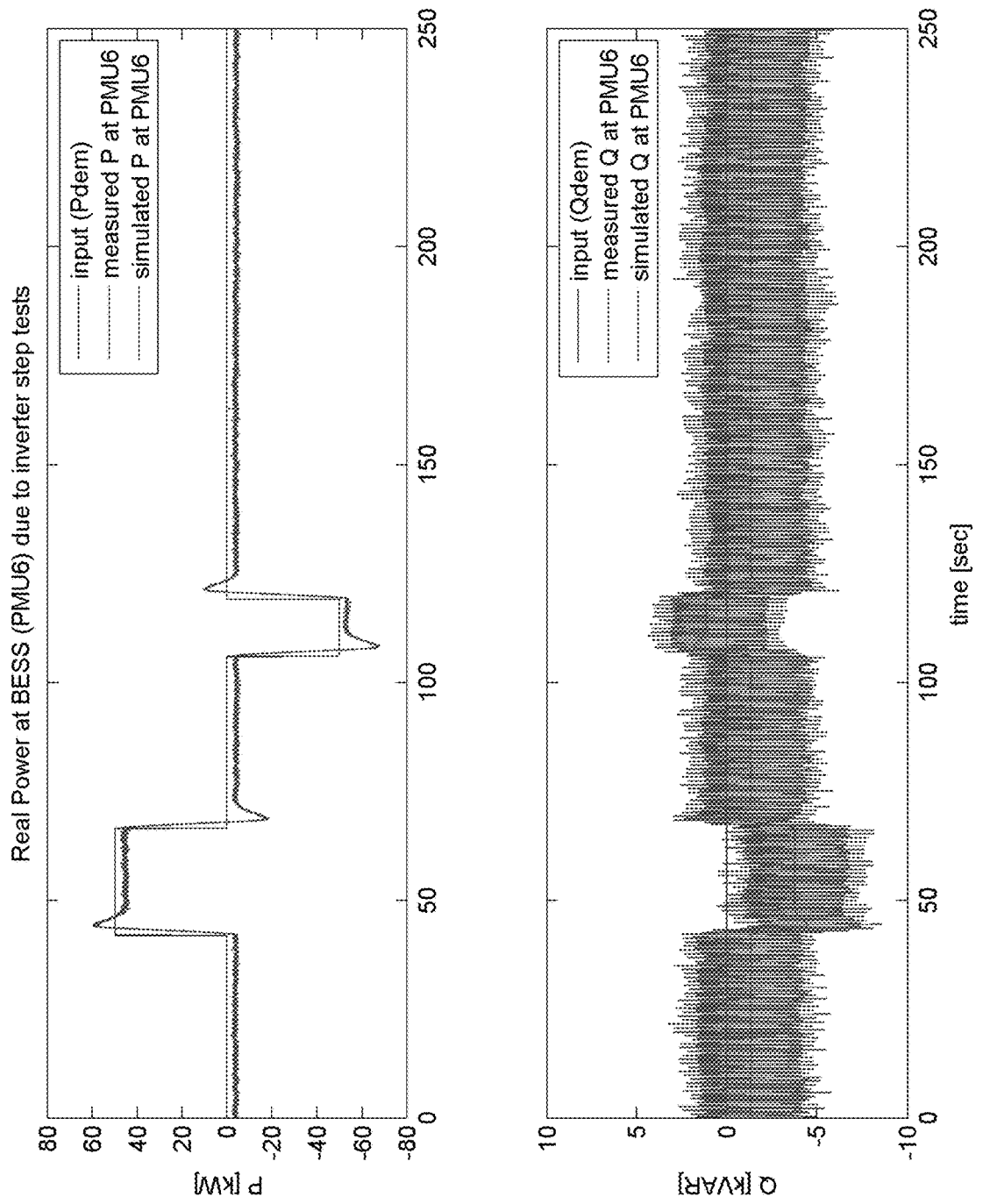
FIG. 21 are charts illustrating the dynamic characterization of real power flow within the KPRMC microgrid.

The power data displayed in FIG. 21 is also compared by a simulation produced by the SDPM 510, denoted earlier by a 2×2 multivariable transfer function R(s). The blue line in the top figure of FIG. 21 refers to the step-wise change in the real power demand signal sent to the inverter 1706. It may be seen that step wise change was a step of +50 kW and s step of −50 kW. A positive value of the real power demand signal of 50 kW causes the battery 1708 to be discharged, while a negative value is used for charging of the battery 1708. The green line is a measurement of the real power flow computed from the 3-phase phasor measurement of PMU6, located at the AC port of the inverter 1706. It may be seen that the inverter 1706 exhibits a slew rate limitation and a small overshoot in power flow. The red line is a dynamic model fitted on the measured data, modeling the inverter slew rate and dynamic response. Main conclusion from this plot is that the SDPM 510 of the power flow on the inverter 1706 is able to simulate the measured real power flow very well. As such, the model is used for off-line tuning of the microgrid controller 1704 to ensure the controller will work with the anticipated inverter dynamics.

While measuring and modeling the dynamic response of the inverter 1706 for the real power flow, a similar procedure has been carried out for the reactive power flow as indicated in the bottom plot of FIG. 21 The blue line refers to the zero-level reactive power demand signal sent to the inverter 1706. The green line is a measurement of the reactive power flow computed from the 3-phase phasor measurement of PMU6, located at the AC port of the inverter 1706. It may be seen that the reactive power flow is noisier, mostly due to the switching control logic in the inverter 1706. Moreover, the step wise change of the real power has caused (dynamic) interaction on the reactive power flow at the AC port of the inverter 1706, as the reactive power flow demand signal was set to 0. It may be seen that the inverter again exhibits a slew rate limitation and a small overshoot in power flow. The red line is a dynamic model fitted on the measured data, modeling the inverter slew rate and dynamic response. Main conclusion from this plot is that the SDPM 510 is able to simulate the measured reactive power flow very well. As such, the model may be used for off-line tuning of the UCSD microgrid controller 1102 to ensure the controller will work with the anticipated inverter dynamics.

D. Short-Term and Long-Term Performance Validation

1. Real and Reactive Power Tracking

For the actual implementation of the microgrid controller 1704 at the KPRMC site, the control algorithms developed in Matlab/Simulink were converted to C++ code and compiled under Microsoft Visual Studio to be able to run in real-time on the Windows Server 2012 SEL3355 computer installed at the medical facility. The translation of Matlab/Simulink code to C++ code was unit tested by generating random input data for the Matlab/Simulink control algorithm and comparing the output of the C++ code given the same input with the output produce by Matlab/Simulink.

Most of the C++ code was associated with the overhead of opening TCP/IP communication ports (WinSockets) to allow PMU and modbus data over TCP/IP to flow in/out of the controller 1704. TCP/IP PMU and Modbus data flow was tested with separate C37.118 and modbus testers. In particular, for the C38.118 communication with the C++ implementation for the microgrid controller 1704; the PMU connection Tester software by the Grid Protection Alliance was used. For Modbus communication the Modbus Slave by Witte Software (http://www.modbustools.com/) was used.

The closed-loop real and reactive power control tracking of the actual microgrid controller 1704 is performed by confirming the power tracking capabilities of the microgrid controller 1704. To illustrate the performance of the microgrid controller 1704, measurements of power flow at the PCC/POI were taken at 60 Hz WITH and WITHOUT power tracking and the results are as illustrated in FIG. 22.

Figure 22:
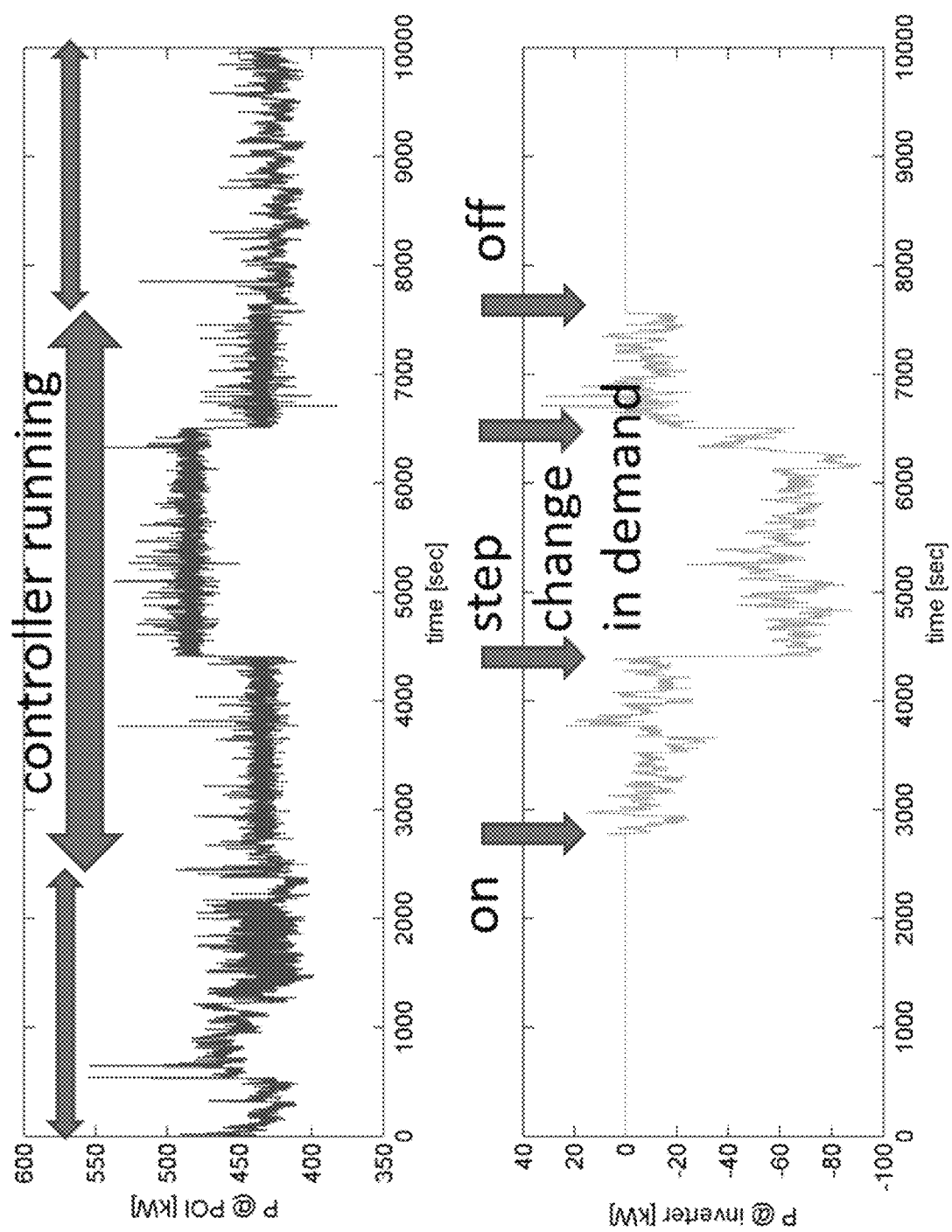
FIG. 22 are charts illustrating the power tracking capabilities of the microgrid controller applied to the KPRMC microgrid.

The difference between without/with power tracking is tested and illustrated in FIG. 22 by simply turning on/off the microgrid controller 1704. The microgrid controller 1704 has the ability to seamlessly turn on/off and provide for a "bumpless" transfer of power flow when the controller is switched on/off. The results in FIG. 22 speak for themselves and power flow is separated into two figures.

The top figure is the 60 Hz measurement of real power flow obtained by the PMU 1702 located at the PCC/POI. It may be seen that power fluctuates +/−100 kW around 425 kW when the microgrid controller 1704 is turned off. As soon the microgrid controller 1704 is tuned on and switched to power tracking/stabilization mode, the average power flow fluctuations are diminished as the average power flow stays constant around 425 kW. High frequency fluctuations in power flow may still be observed due to the 60 Hz sampling rate, but such power flow fluctuations are not controllable due to the much slower update rate of the inverter power flow demand signal at 1 Hz. The conclusion of this test/figure is that power flow may be regulated to a desired value (in this case of 425 kW and 500 kW) if needed. Such step wise changes in desired power flow at the PCC/POI are in-line with ADR 2.0 demand response request and the microgrid controller 1704 is able to provide such power tracking.

The bottom figure show the demand signal sent to the inverter 1706 during the actual closed-loop testing of the microgrid controller 1704. Clearly, zero power demand signals are sent when the microgrid controller 1704 is turned off, while modulated power to keep the power flow at the PCC constant despite (internal) power demand fluctuations occur within the medical facility.

2. State of Charge (SoC) Gated Real Power

In line with the requirement to manage the SoC of the BESS, SoC-gated closed-loop (feedback) control testing of the microgrid controller 1704 is used to demonstrate that the microgrid controller 1704 is able to carefully keep the SoC of the battery 1708 at any desired level. Variations in the SoC of the battery 1708 occur due to the presence of solar power and its variations during a full day of operation of the three-port PPS inverter 1706. The results of SoC tracking for a full day of operation are illustrated in FIG. 23.

Figure 23:
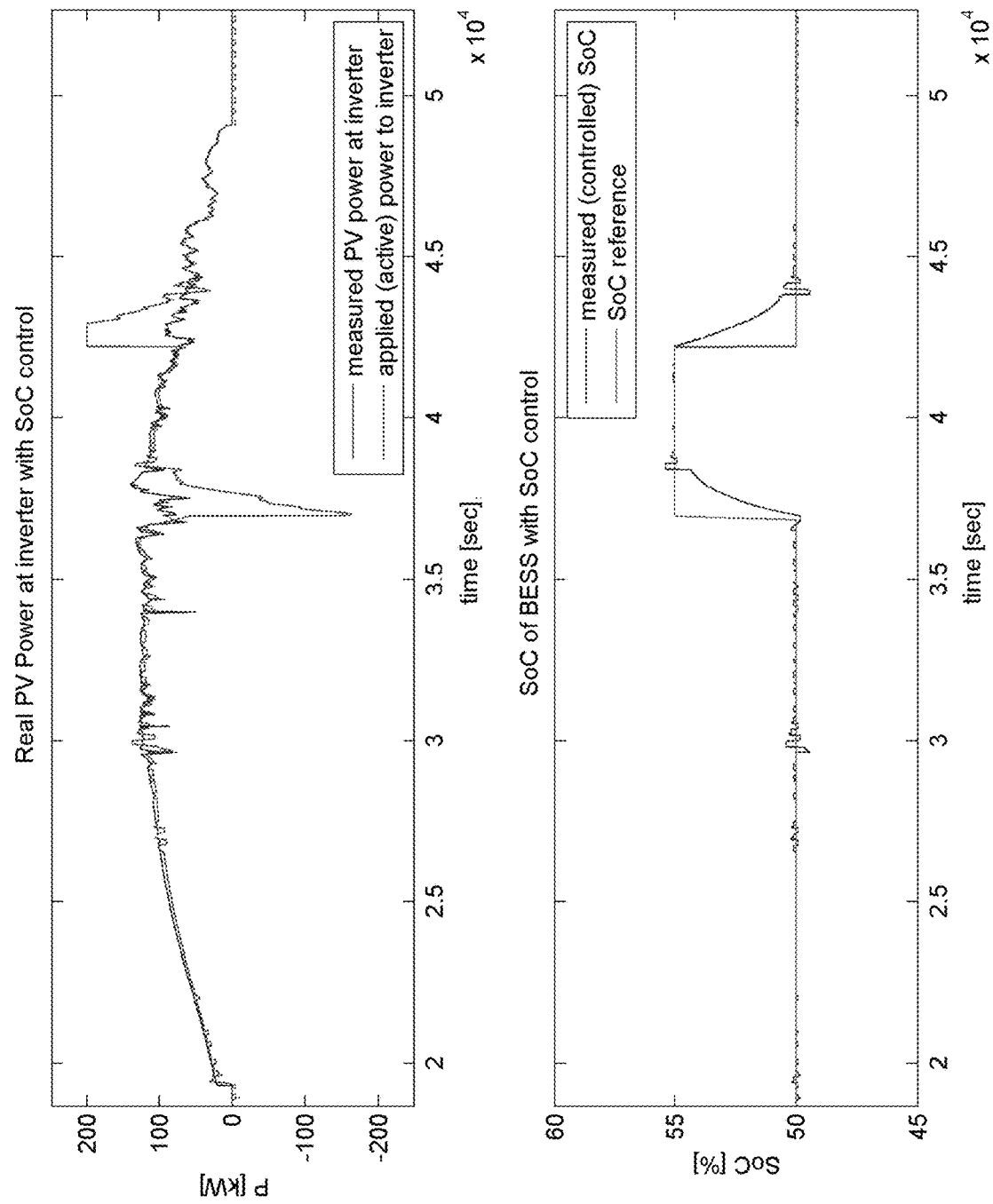
FIG. 23 are charts illustrating results from closed-loop testing of the SoC-gated microgrid control by the microgrid controller within the KPRMC microgrid.

FIG. 23 demonstrates how well the microgrid controller 1704 is able to keep the SoC of the battery 1708 at a desired level over a whole day during PV power generation. FIG. 23 consists of two plots. The top figure has two lines. The blue line shows the measurement of the PV power as processed by the PPS BIGI inverter 1706 during the solar generation part of the day. It may be observed that the solar power peaks to approximately 160 kW. The red line shows the active/real power demand computed by the microgrid controller 1706 and sent to the PPS BIGI inverter 1706.

From this plot it may be concluded that the real power demand signal nicely follows the generated PV power most of the time, but two large deviations from the generated PV power may be observed. These two large deviations coincide with a change in the desired SoC level of the battery 1708 depicted in the bottom plot. The bottom plot has also two lines. The red lines now refer to the desired SoC level of the battery 1708. It may be observed that is set to 50% but a step wise change is made right after the peak solar generation to go to 55%. The blue line is the actual measure SoC as reported by the Battery Management System (BMS). From this plot it may be concluded that the measured SoC reported by the BMS nicely tracks the desired SoC of 50% throughout the times when PV power is changing (ramps up/down), and when the SoC reference is changed stepwise to 55%, the microgrid controller 1704 modulates the inverter demand signal (AC power output) to ensure the battery 1708 reaches the desired SoC of 55% as fast as possible.

Figure 24:
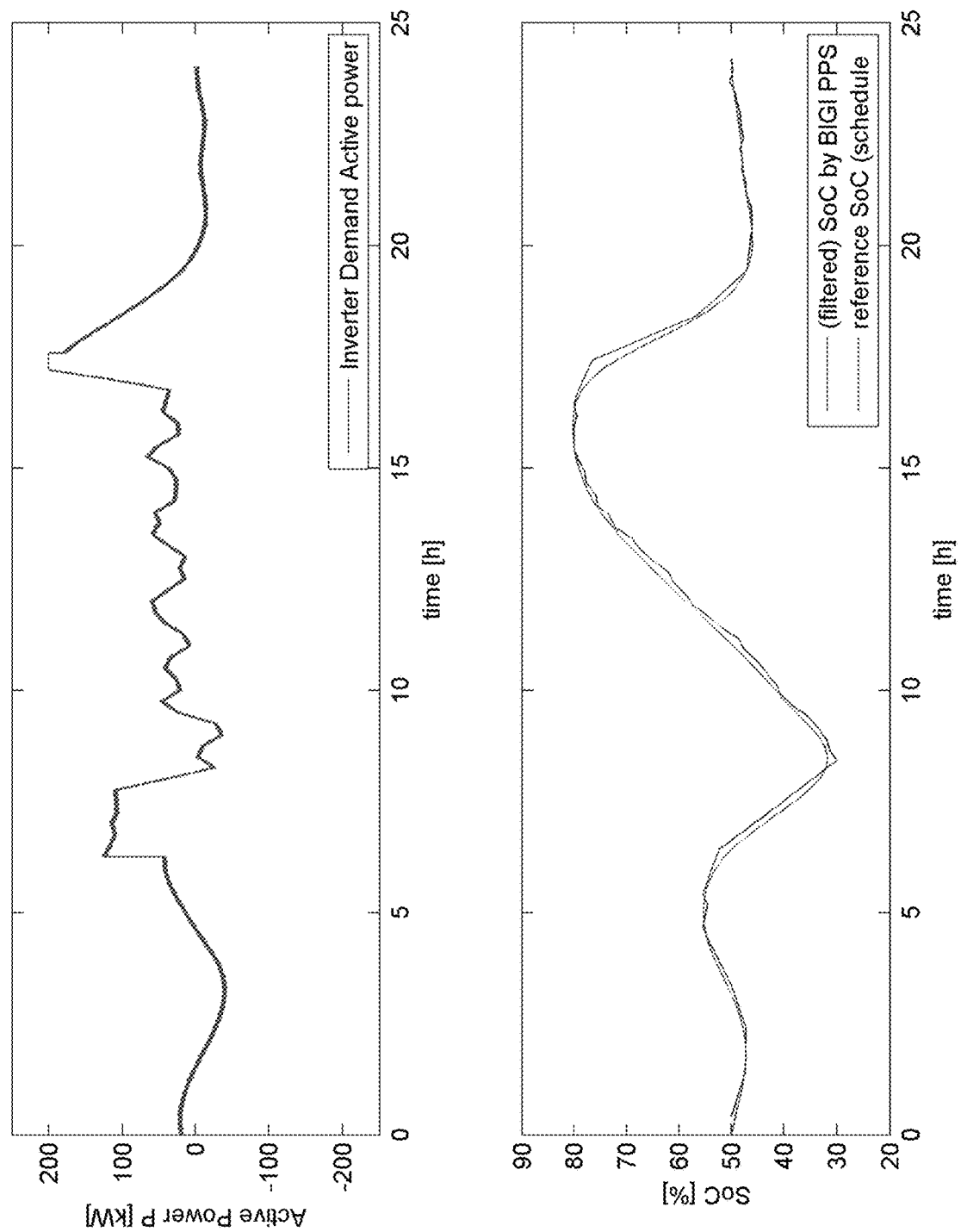
FIG. 24 are charts illustrating results from closed-loop testing of the SoC-gated microgrid control by the microgrid controller within the KPRMC microgrid.

It is worth noting that the SoC tracking has been tested for more complex SoC tracking profiles, optimized to give the best financial benefit of charging/discharging the battery 1708 throughout the day. A more complicated SoC profile and the performance of the microgrid controller 1704 to be able to track that profile is illustrated in FIG. 24. FIG. 24 illustrates closed-loop control testing of the SoC-gated microgrid control for SoC management of the battery 1708 using a SoC reference for a financially optimal battery charging/discharging profile.

3. Autonomous SoC-Gated and Demand Limit Real Power Control

In line with the requirement to manage both the SoC of the battery 1708 and limited the real power demand at the PCC/POI, the autonomous SoC-gated and Demand Limit closed-loop (feedback) control testing of the microgrid controller 1704 is used. This fully functional microgrid control algorithm now ensures daily battery charging/discharging to minimize ToU pricing, while at the same time limit peak demand at the POI/PCC to reduce demand charge costs.

Figure 25:
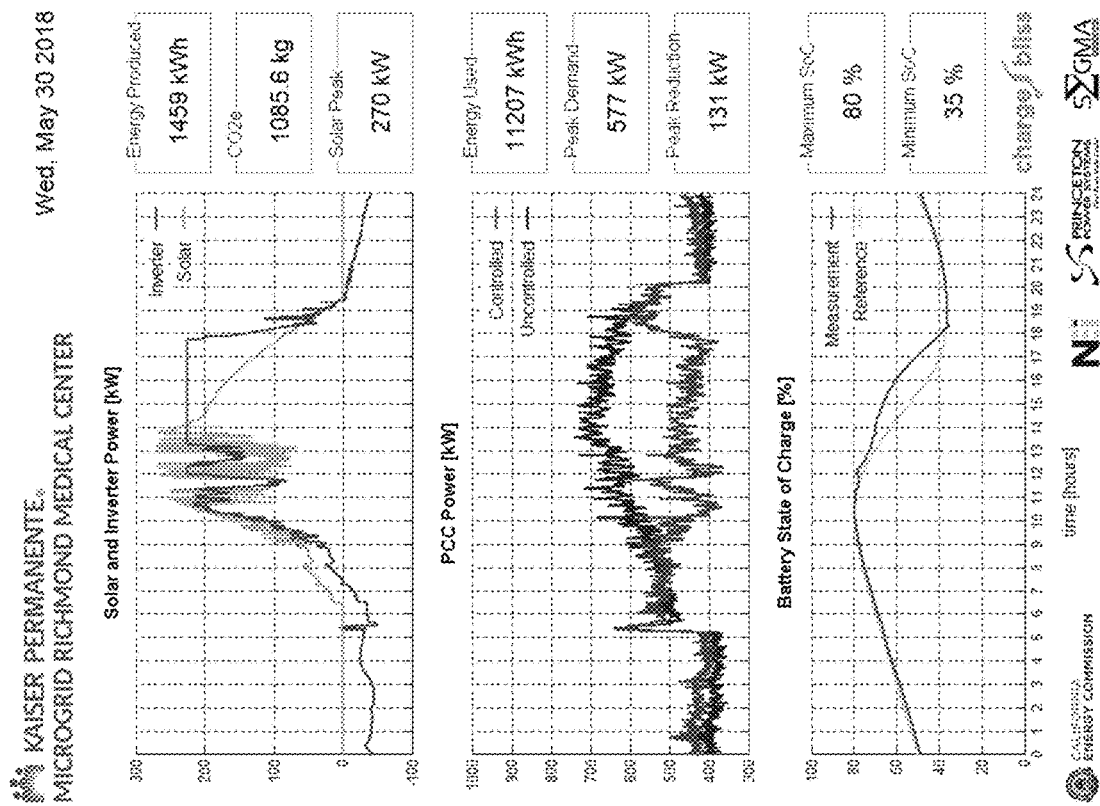
FIG. 25 are charts illustrating the daily real power PV production and inverter output, PCC power demand, and SoC within the KPRMC microgrid.

An overview of the combined effect of SoC management and demand limit reduction is shown in FIG. 25 that provides a quick overview of all the important performance characteristics for a single day, in this case for May 30, 2018. FIG. 25 provides an overview of daily real power PV production and inverter output (top figure), uncontrolled and controlled power demand at the PCC/POI (middle figure) and SoC with its reference (bottom figure). FIG. 25 illustrates that inverter real real-power output is smoothened (red line, top figure), despite large variations in PV real power production (green line, top figure). At the same time, the inverter 1706 produces power to reduce peak demand (middle figure) and manage the SoC (bottom figure) to charge/discharge the battery 1708 on a daily schedule.

Figure 26:
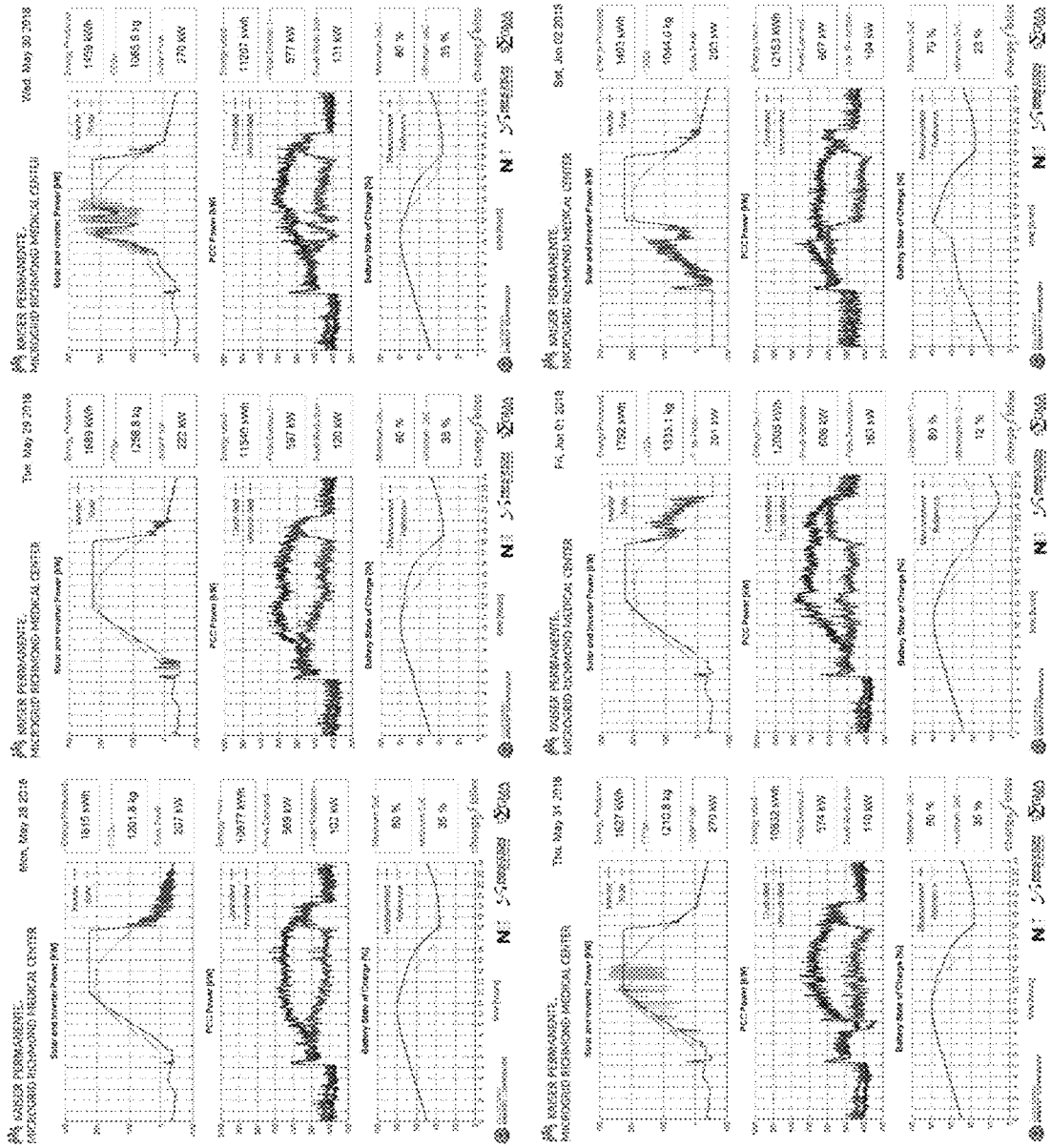
FIG. 26 are charts illustrating the multi-daily real power PV production and inverter output, PCC power demand, and SoC within the KPRMC microgrid.

Long term evaluation of the performance of the microgrid controller 1704 is provided by generation of the data displayed in FIG. 25 for every single day that the microgrid controller is running. Such images are available via a web interface and a sample of multi-daily performance is illustrated in FIG. 26. FIG. 26 is an overview of multi-daily real power PV production and inverter output (top figure), uncontrolled and controlled power demand at the PCC/POI (middle figure) and SoC with its reference (bottom figure).

Unless otherwise stated, all measurements, values, ratings, positions, magnitudes, sizes, locations, and other specifications that are set forth in this specification, including in the claims that follow, are approximate, not exact. They are intended to have a reasonable range that is consistent with the functions to which they relate and with what is customary in the art to which they pertain.

The foregoing description of the preferred embodiment has been presented for the purposes of illustration and description. While multiple embodiments are disclosed, still other embodiments will become apparent to those skilled in the art from the above detailed description. The disclosed embodiments are capable of modifications in various obvious aspects, all without departing from the spirit and scope of the protection. Accordingly, the detailed description is to be regarded as illustrative in nature and not restrictive. Also, although not explicitly recited, one or more embodiments may be practiced in combination or conjunction with one another. Furthermore, the reference or non-reference to a particular embodiment shall not be interpreted to limit the scope. It is intended that the scope or protection not be limited by this detailed description, but by the claims and the equivalents to the claims that are appended hereto.

Except as stated immediately above, nothing that has been stated or illustrated is intended or should be interpreted to cause a dedication of any component, step, feature, object, benefit, advantage, or equivalent, to the public, regardless of whether it is or is not recited in the claims.

What is claimed is:

1. A microgrid system comprising:
   a battery energy storage system (BESS") configured to store direct current (DC) electrical energy therein;
   one or more renewable energy sources configured to generate DC electrical power;
   a plurality of power consuming loads;
   a load manager coupled between the BESS and the one or more renewable energy sources and the plurality of power consuming loads, wherein the load manager includes an inverter configured to convert current received therein; and a microgrid controller coupled to the load manager, wherein the microgrid controller is operable to:
  adjust an output frequency of the inverter in response to both a state of a frequency of the microgrid and a power transfer state of the load manager;
  receive power measurement data associated with a power production of the one or more renewable energy sources;
  receive energy level measurement data associated with an energy level of the BESS; and
  selectively control an amount of electrical energy stored in the BESS based on at least a portion of the power measurement data and the energy level measurement data.

2. The microgrid system of claim 1, wherein the microgrid controller is operable to generate, using a control algorithm function, a stored energy profile for the BESS.

3. The microgrid system of claim 2, wherein the microgrid controller is operable to implement, in conjunction with the control algorithm function, a Kalman filter operation to generate a model based state reconstruction of a stored energy profile for the BESS.

4. The microgrid system of claim 2, wherein the received energy level measurement data is an absolute measure of energy stored in the BESS.

5. The microgrid system of claim 2, wherein the received energy level measurement data is a relative measure of energy stored in the BESS.

6. The microgrid system of claim 2, wherein the microgrid controller is further operable to generate a feedback data stream comprising measurement data associated with operation of at least one of the BESS, the one more renewable energy sources, the inverter, and combinations thereof.

7. The microgrid system of claim 6, wherein the microgrid controller is further operable to generate a reference data stream comprising reference data associated with desired stored energy levels for the BESS.

8. The microgrid system of claim 7, wherein the microgrid controller is further operable to generate a control data stream comprising control data for selectively controlling the amount of electrical energy stored in the BESS, wherein the amount of electrical energy stored in the BESS is determined accordance therewith.

9. The microgrid system of claim 8, wherein the microgrid controller generates the control data stream by subjecting a least a portion of the feedback data stream and the reference stream to a feedback control algorithm function.

10. The microgrid system of claim 9, wherein the control data stream includes at least one of current dispatch commands transmitted to the BESS, AC real power dispatch commands transmitted to the inverter, and combinations thereof.

11. A method for controlling energy storage with in a microgrid system, wherein the microgrid system comprises:
  a battery energy storage system (BESS") configured to store direct current (DC) electrical energy therein
  one or more renewable energy sources configured to generate DC electrical power;
  a plurality of power consuming loads;
  a load manager coupled between the BESS and the one or more renewable energy sources and the plurality of power consuming loads, wherein the load manager includes an inverter configured to convert current received therein; and
  a microgrid controller coupled to the load manager, wherein the microgrid controller is operable to adjust an output frequency of the inverter, the method comprising
  receiving, at the microgrid controller, power measurement data associated with a power production of the one or more renewable energy sources;
  receiving, at the microgrid controller, energy level measurement data associated with an energy level of the BESS; and
  selectively controlling, by the microgrid controller, an amount of electrical energy stored in the BESS based on at least a portion of the power measurement data and the energy level measurement data.

12. The method of claim 11, further comprising generating, by the microgrid controller, using a control algorithm function, a stored energy profile for the BESS.

13. The method of claim 12, further comprising implementing, by the microcontroller, in conjunction with the control algorithm function, a Kalman filter operation to generate a model based state reconstruction of a stored energy profile for the BESS.

14. The method of claim 12, wherein the received energy level measurement data is an absolute measure of energy stored in the BESS.

15. The method of claim 12, wherein the received energy level measurement data is a relative measure of energy stored in the BESS.

16. The method of claim 12, further comprising generating, by the microgrid controller, a feedback data stream comprising measurement data associated with operation of at least one of the BESS, the one more renewable energy sources, the inverter, and combinations thereof.

17. The method of claim 16, further comprising generating, by the microgrid controller, a reference data stream comprising reference data associated with desired stored energy levels for the BESS.

18. The method of claim 17, further comprising generating, by the microgrid controller, a control data stream comprising control data for selectively controlling the amount of electrical energy stored in the BESS, wherein the amount of electrical energy stored in the BESS is determined accordance therewith.

19. The method of claim 18, wherein control data stream is generated by subjecting a least a portion of the feedback data stream and the reference stream to a feedback control algorithm function.

* * * * *